March 22, 1960

W. LEATHERS ET AL 2,929,213

ALTERNATING PULSE SERVO SYSTEM

Filed April 26, 1952

INVENTORS
WARD LEATHERS, HUGO PANISSIDI &
PAUL ANDREESSEN
BY Robert S. Dunham
ATTORNEY INVENTORS
WARD LEATHERS, HUGO PANISSIDI
& PAUL ANDREESSEN
BY Robert S. Dunham
ATTORNEY

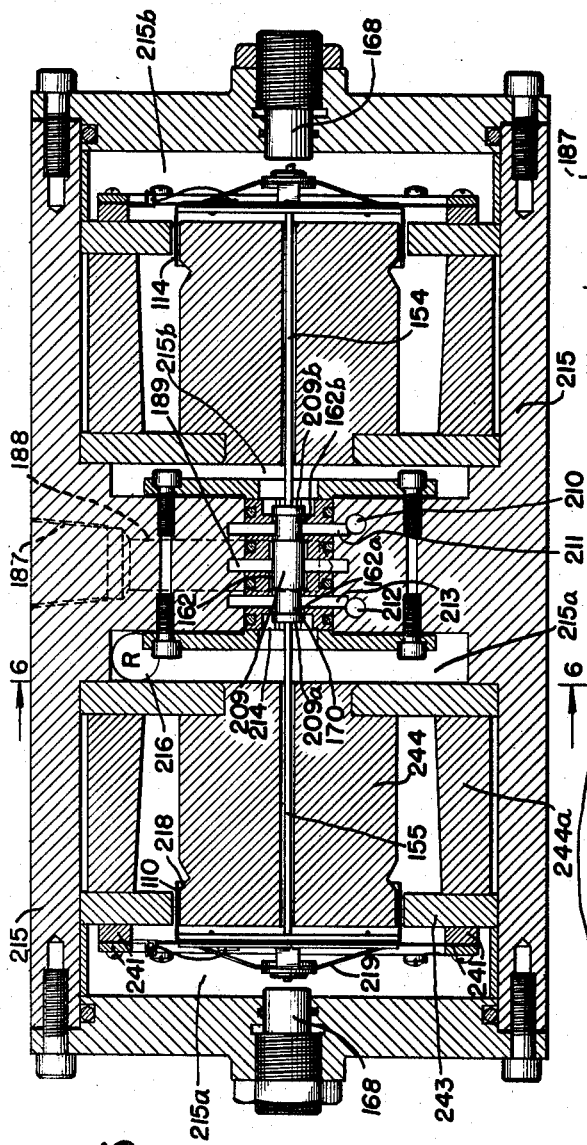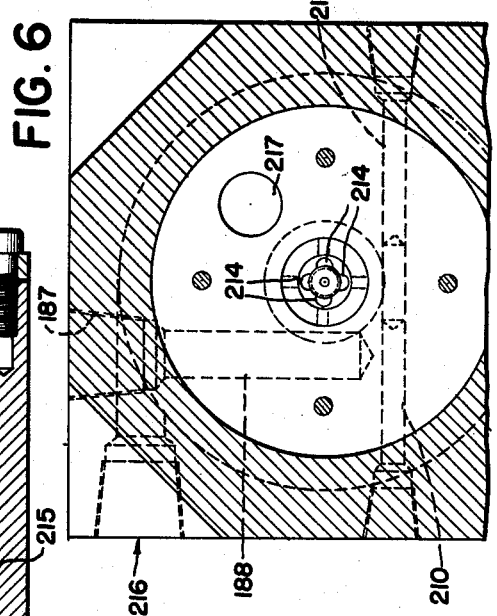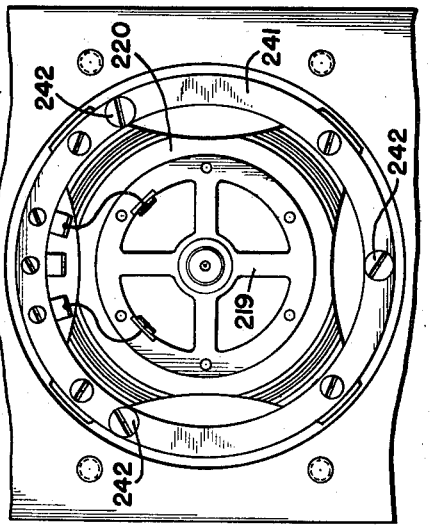

INVENTORS
WARD LEATHERS, HUGO PANISSIDI
& PAUL ANDREESSEN
BY Robert S. Dunham
ATTORNEY

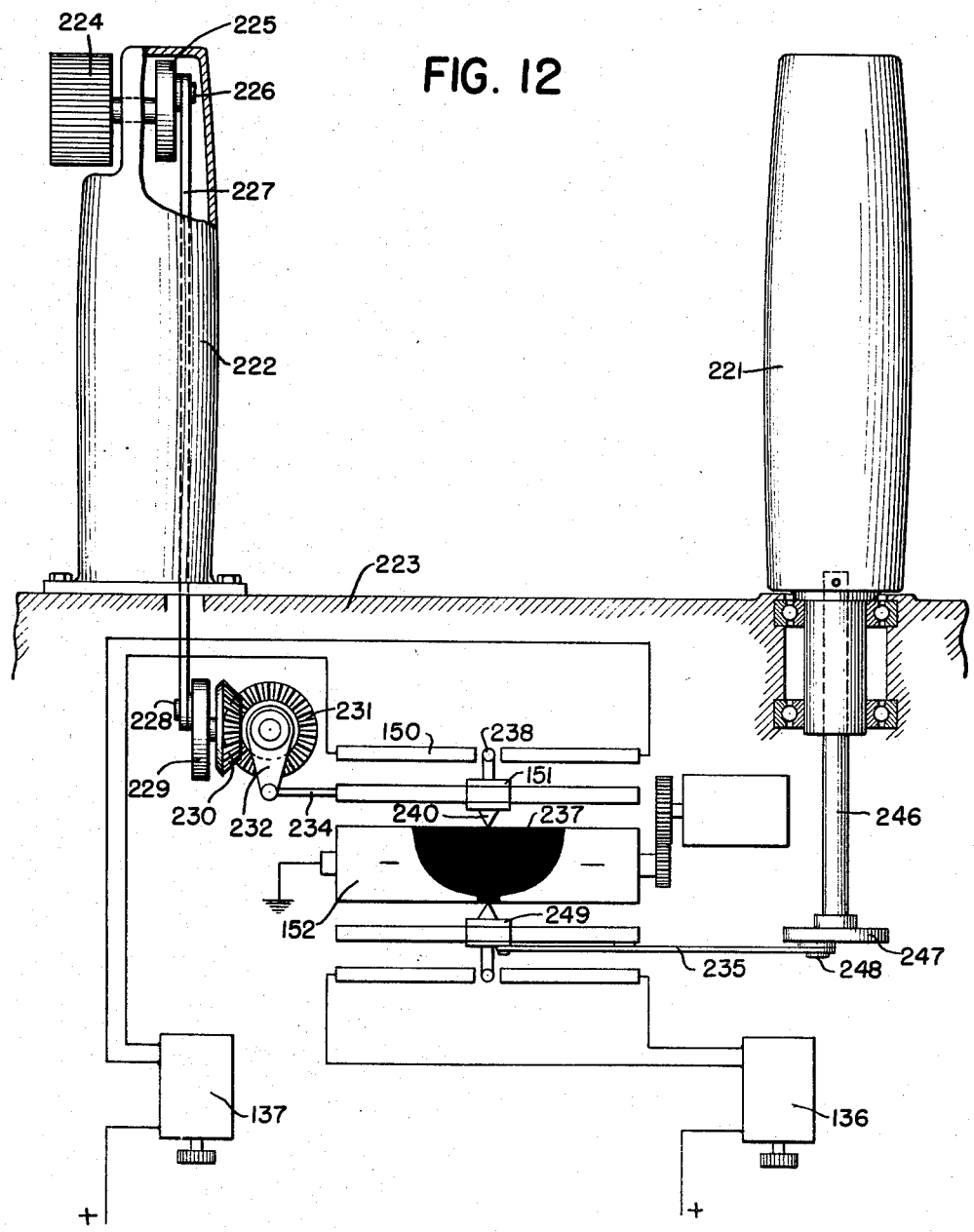

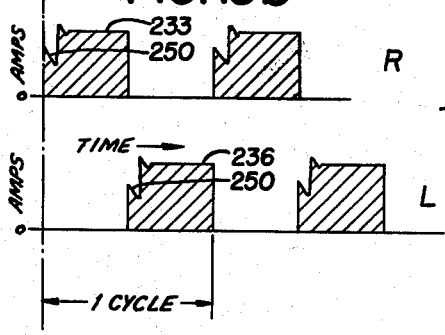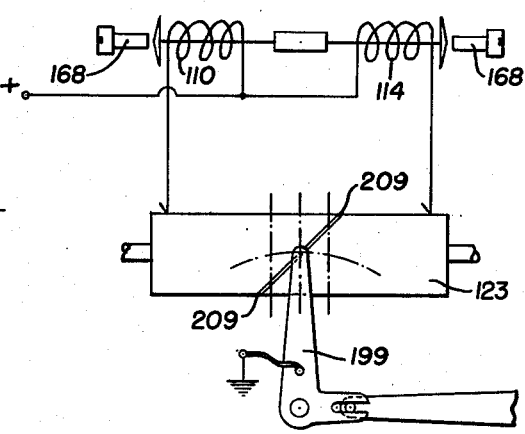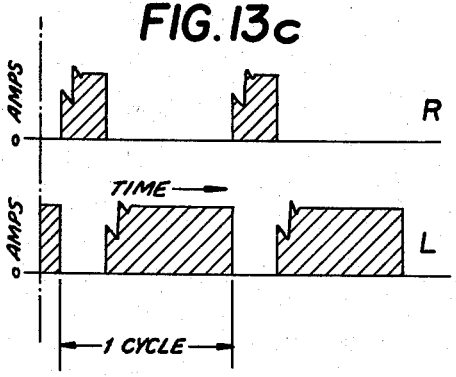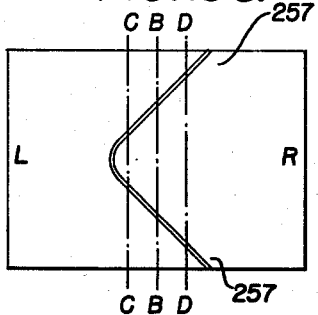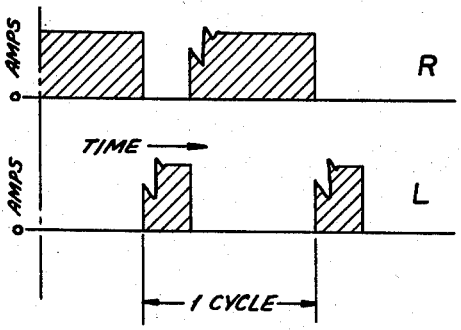

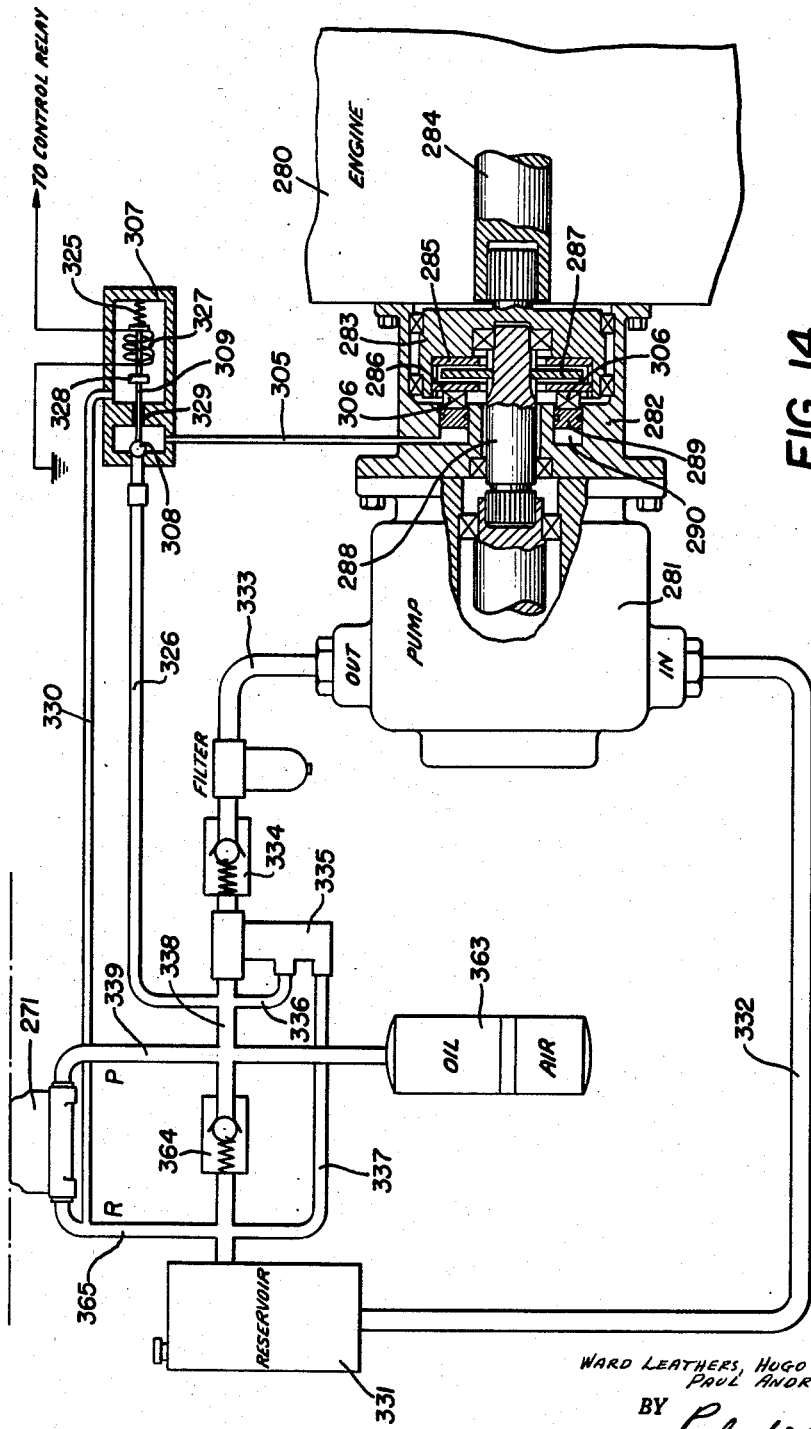

INVENTORS.
WARD LEATHERS, HUGO PANISSIDI &
PAUL ANDREESSEN
BY
Robert S. Dunham
ATTORNEY

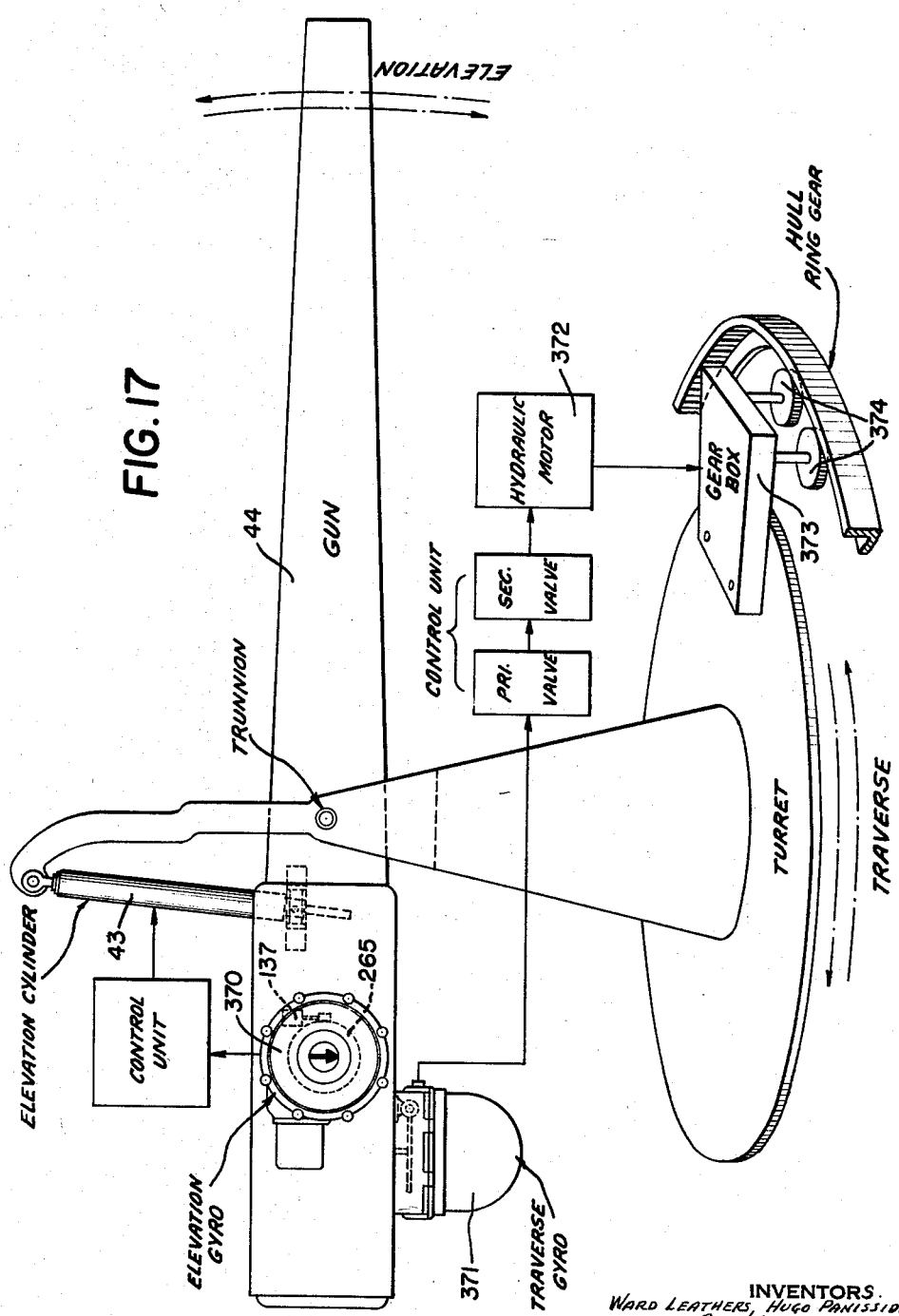

United States Patent Office 2,929,213
Patented Mar. 22, 1960

2,929,213

ALTERNATING PULSE SERVO SYSTEM

Ward Leathers, Hugo Panissidi, and Paul Andreessen, Brooklyn, N.Y., assignors, by mesne assignments, to the United States of America as represented by the Secretary of the Army Application April 26, 1952, Serial No. 284,606

1 Claim. (Cl. 60—53)

This invention deals with gun stabilization and control systems in general, and more particularly with a gun stabilization and control system as applied to a tank.

The primary object of this invention is to provide a stabilization system for a positionable gun wherein stabilization is maintained in both traverse and elevation so that for any gun setting its relative position with respect to a predetermined datum or celestial reference line will remain unaltered by means of supplying alternate timed power pulses to the gun positioning mechanism.

An object of this invention is to be able to effectively remove backlash without the necessity of using extreme care in fitting parts for no play. This is very beneficial in manufacturing consideration especially where mass production is to be employed.

Another object of this invention is to give superior stabilization of a gun, or other object, relative to space. In other words, the system of this invention holds the gun steady while the vehicle or other body on which the gun is mounted may be changing its position rapidly. The superior quality of stabilization gained by this invention is enhanced by its "let go" feature, which in effect lets the inertia of the gun work for, instead of against, its stabilization upon high rates of acceleration.

Another object of this invention is the advantage gained from elimination of static friction. Because the parts are kept in constant agitation even when there is no control being exercised over the gun position, no static friction will be present to give it undesirable sticking action.

Another object of this invention is to gain stable control of a gun or other object. Because of the inherent high speed response of the servo used, the time delay between the error signal and correcting signal is in the order of a few milliseconds thereby requiring a minimum of damping to prevent hunting of the system at the required power level.

Another object of the invention is to decrease recovery time of a gun or other object without the use of auxiliary controls. Because of the nature of the servo used, when a balance or "no control" position is being approached, the reverse pulses increase in time and approach equal duration with the controlling pulses as will be more fully explained. It is this application of the reverse pulses which slows down the relative movement of the gun gradually thus minimizing overshooting.

Another object of this invention is to provide a system which is rugged, simple and compact without destroying effectiveness. Since the control is a function of time rather than amplitude, it becomes a simple On-Off control with a rating not controlled by any form of positioning. As a result, it needs no provision for bias or any other adjustments in the field. Furthermore, the system does not necessitate the use of electronic controls to add to the complexity of maintenance and repair.

Another object of this invention is to provide a system that will permit its power source to be variable to a considerable degree such as will be the case when the power source is driven directly by the engine of a vehicle, e.g., a tank. Since time and not amplitude form the basis of control for the system, any variations in power from a specified amplitude, affect the stability of the system in a negligible manner.

This system employs a basic improvement which is embodied in the alternate timed power pulse control of the gun or other object being stabilized and controlled.

Fig. 5 is an enlarged detail, side elevational view partly in cross-section showing a primary valve;

Fig. 6 is a cross-sectional view of the primary valve of Fig. 5 taken along the line 6—6 of Fig. 5 looking in the direction of the arrows;

Fig. 7 is an end view of the primary valve shown in Fig. 5, with the end plate removed;

Fig. 12 is an enlarged detail schematic view of the manual control elements;

Fig. 13 is an enlarged view of the commutator drum in conjunction with the circuits it controls;

Fig. 13a is a view of the surface of the commutator drum unrolled;

Figs. 13b, 13c and 13d are diagrams illustrating current conditions in the right and left hand circuits of the system with the pickoff mechanism in use;

Fig. 14 is a schematic diagram of the hydraulic supply system located in the hull of the tank for an alternative control system of this invention;

Figure 15A:
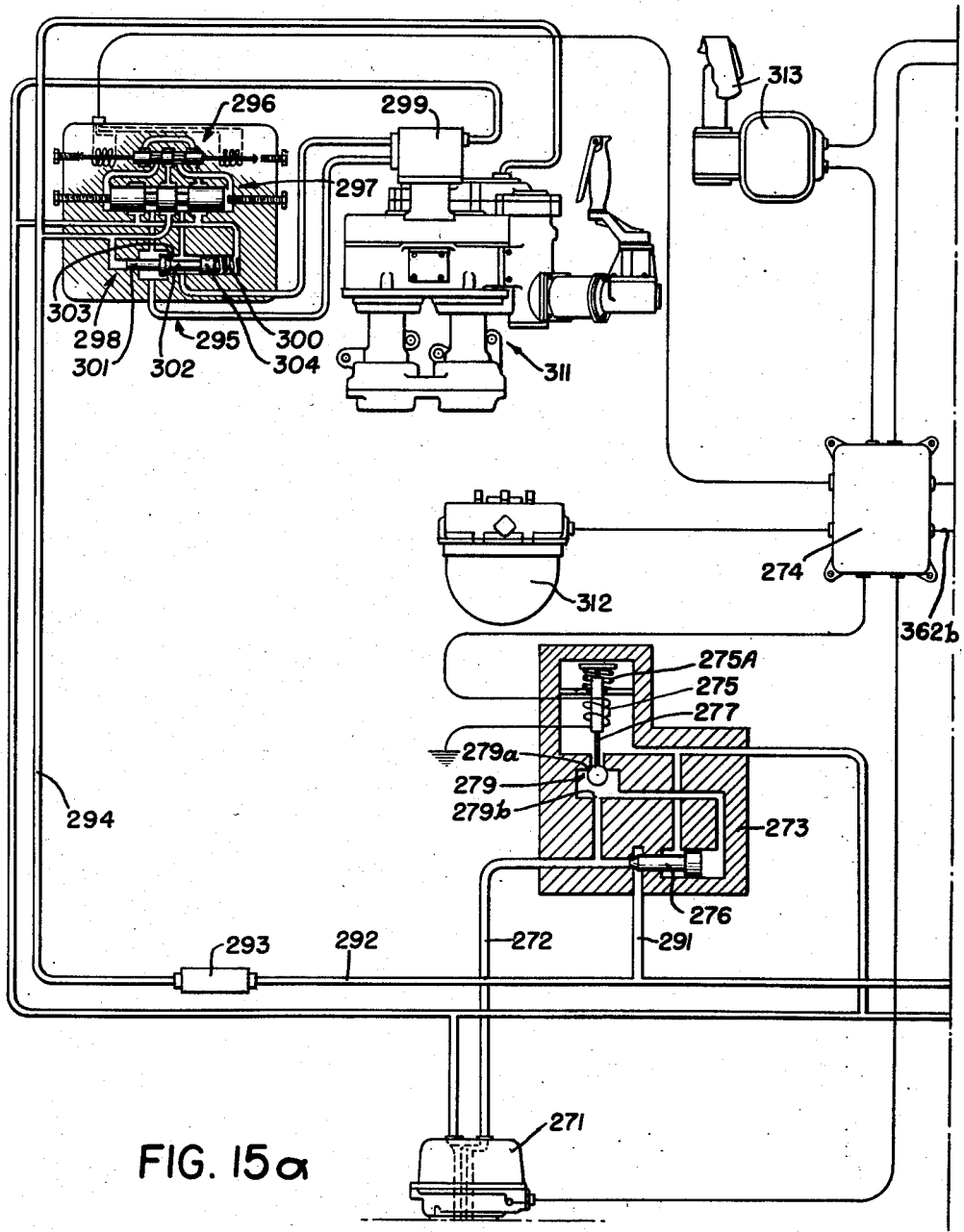
Figure 15:
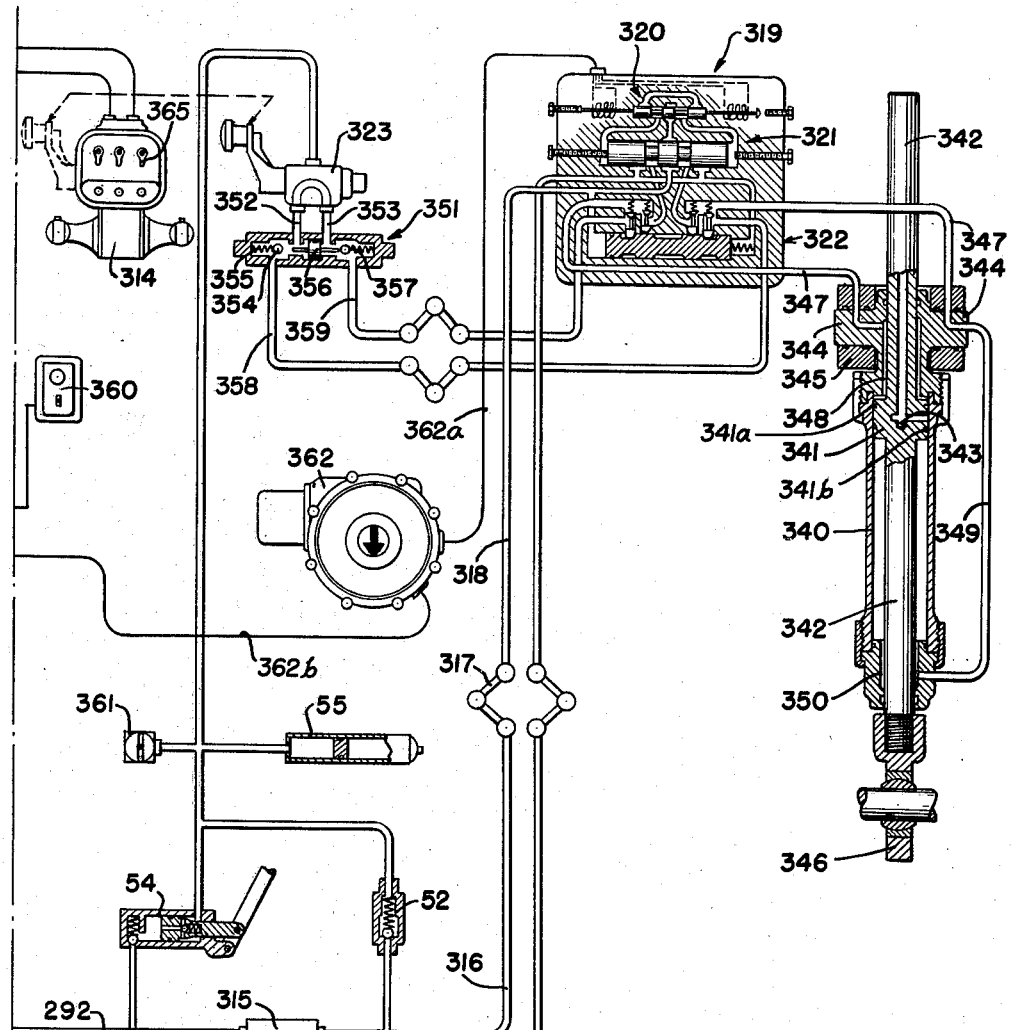
Figure 16:
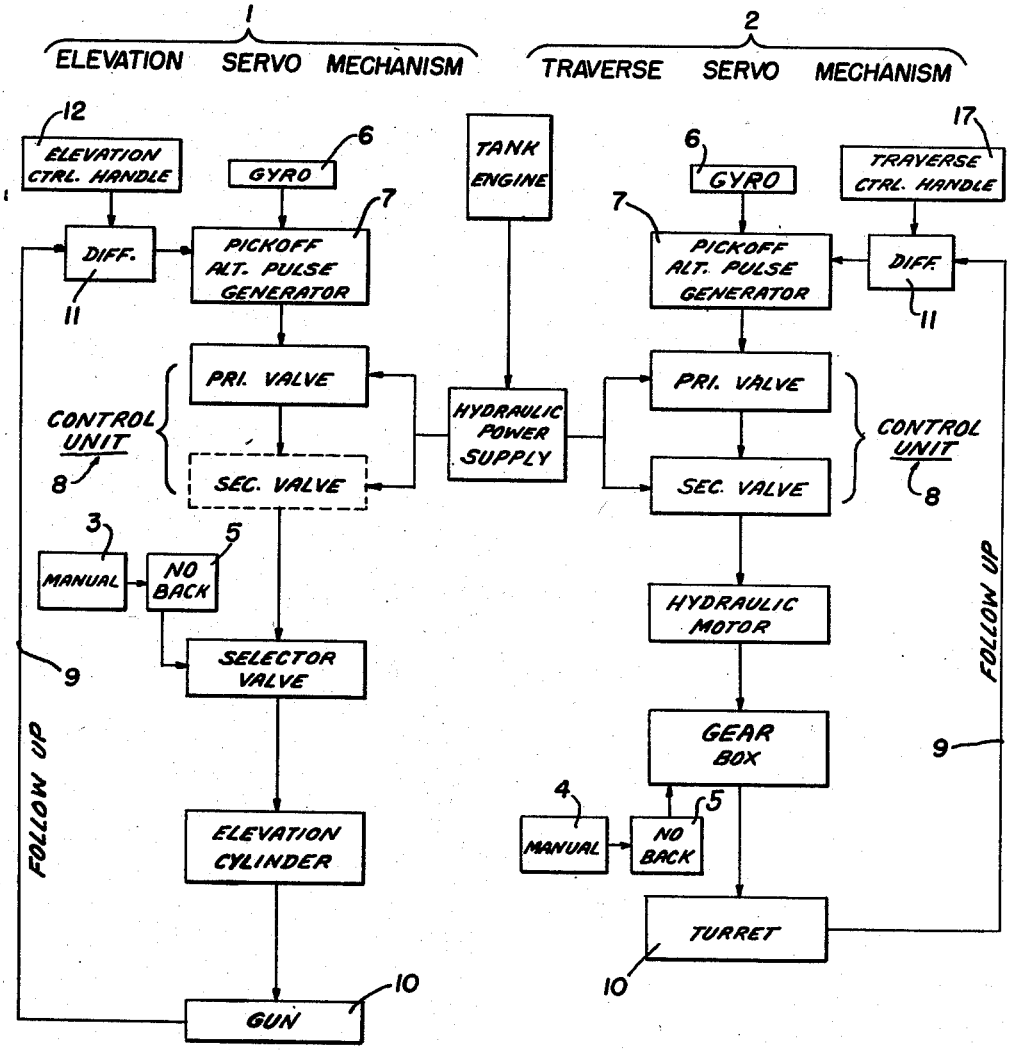

Figs. 15a and 15b together constitute a schematic layout of the alternative system of this invention located in the turret and embodying some improved details;

Fig. 16 is a block diagram of the complete traverse and elevation serve control systems of this invention showing the functional relationship of all the elements involved; and Fig. 17 is a schematic diagram showing the physical relation of the elements, especially the gyroscopes and the gun, to clarify the embodiments of the differential mechanism of each servo system.

The basic elements of the system of this invention are best explained with reference to a block diagram such as that illustrtated in Fig. 16. The system includes three basic functions, namely: one, gun stabilization and tracking by means of two independent servo mechanisms 1 and 2; two, manual gain control whereby the gun may be positioned in either the elevation or traverse plane by hand driven mechanisms 3 and 4; three, travel lock whereby the gun and turret will be automatically locked to the tank hull when the stabilizer or hand driven mechanisms are not in use, such travel lock being accomplished by no-backs 5, used in conjunction with the hand driven mechanisms 3 and 4.

In order to stabilize the gun in both the elevation and traverse planes with respect to a celestial line of reference, it requires two independent servo mechanisms 1 and 2 as shown in Fig. 16, each servo system comprising a gyroscope 6 to establish a mechanical celestial line of reference, a sensing device 7 for the serevo mechanism to detect any angular variations from the gyroscopic line of reference, a controlling unit 8 which controls power to a prime mover as a function of these angular variations, and finally a follow-up 9 from the load 10 of the prime mover to the sensing device 7 through a mechanical differential 11 to complete the servo loop. The other input to the mechanical differential 11 is from the gunner's or commander's tracking handles, 12.

The purpose of the stabilizer and tracking systems is to keep the gun stabilized with respect to the gyroscopic line of reference regardless of vehicle motion over reasonably rough terrain and at the same time allow the gunner or commander to vary the position of the sensing mechanism 7 with respect to the gyroscopic line of reference in order to track the gun with a moving target or correct for parallax or position the gun to a new target location.

The basic improvement of this system lies in providing a gun stabilization and control system which uses alternate timed mechanical pulses to control position of a gun or other object about an axis. By such means four very important results are obtained. First, since the gun is being given a series of equal and opposite hammer blows when no control is being exerted, the effect is that of having the gun "floating," about the axis. Therefore, the slightest movement of the body upon which the gun is mounted will be felt in relative motion between the gun and this body. In other words, there is no initial force applied to the gun when movements of the body take place around the gun; there is instead a "let go" action. The inertia of the gun is, therefore, unopposed and its inertia is allowed to work for stabilization rather than against stabilization. The advantage of this is obvious when the large mass of the gun is considered. Such large mass means that inertia forces tending to hold the gun in a given position will be large, and therefore, if left to act in a natural way, the gun will not change position, which is exactly what is desired in stabilization. Second, an important result of this alternate pulse system lies in the elimination of backlash throughout. By keeping the moving parts vibrating rapidly back and forth, an average or median position is obtained which does not change relative to the adjacent parts so that backlash is effectively eliminated. A great practical advantage is the result of such means of eliminating backlash, namely, the parts used may be manufactured in quantity with normal tolerances such that the cost of manufacture of this control system will not be prohibitive or impractical.

Third, since the power control of this servo is a function of alternate pulse time duration it permits the use of an engine driven hydraulic power supply. Variations in the amplitude of the pulses have a negligible effect on the operation of the control, because the control system is responsive to duration rather than amplitude of the pulses.

Fourth, since the alternate timed pulse duration is governed by the error of the gun with respect to the servo line of reference, there are no adjustments possible in the field, other than those set up for manufacturing specifications.

A gun stabilization system of the type embodied in the present invention is particularly designed for, and valuable in use on a tank. A tank travels over extremely rough terrain when in combat, and also can make very sharp and sudden turns. The result is that if the gun which is carried by the tank is not well stabilized, especially in traverse, it becomes impossible to maintain any good accuracy of fire while the tank is in motion. This is true of a target which is stationary and doubly true when a target is also in motion.

Stabilization of a gun in a moving vehicle is possible only when the system employs a celestial line of reference, i.e., maintains the orientation of the gun constant with respect to space.

When a tank is traveling in some line other than directly toward the target then parallax will be introduced, therefore, some provision must be made for manually operating the power control to track the gun in botht elevation and traverse to effect correction for deviation introduced by parallax. Another reason for being able to reposition the gun by tracking is that often the target itself may also be moving. Also, it may be desired to change from one target to another which may be at a considerably different elevation or angle of traverse from the initial target. These various conditions dictate that supplemental manual power controls be provided to enable the gunner to rapidly reposition (or track) the gun either in elevation or traverse or both. Such tracking controls are also arranged to either reposition the gun at a relatively slow or at relatively more rapid rate depending upon the extent of manual adjustment. As will appear in the detailed description of the system, such tracking control is introduced by manual control handles in conjunction with electric motors, for repositioning the pickoff mechanism of the gyroscopes which are maintaining the gun stabilized about the two axes mentioned, i.e., in traverse or azimuth and in elevation.

Figure 1:
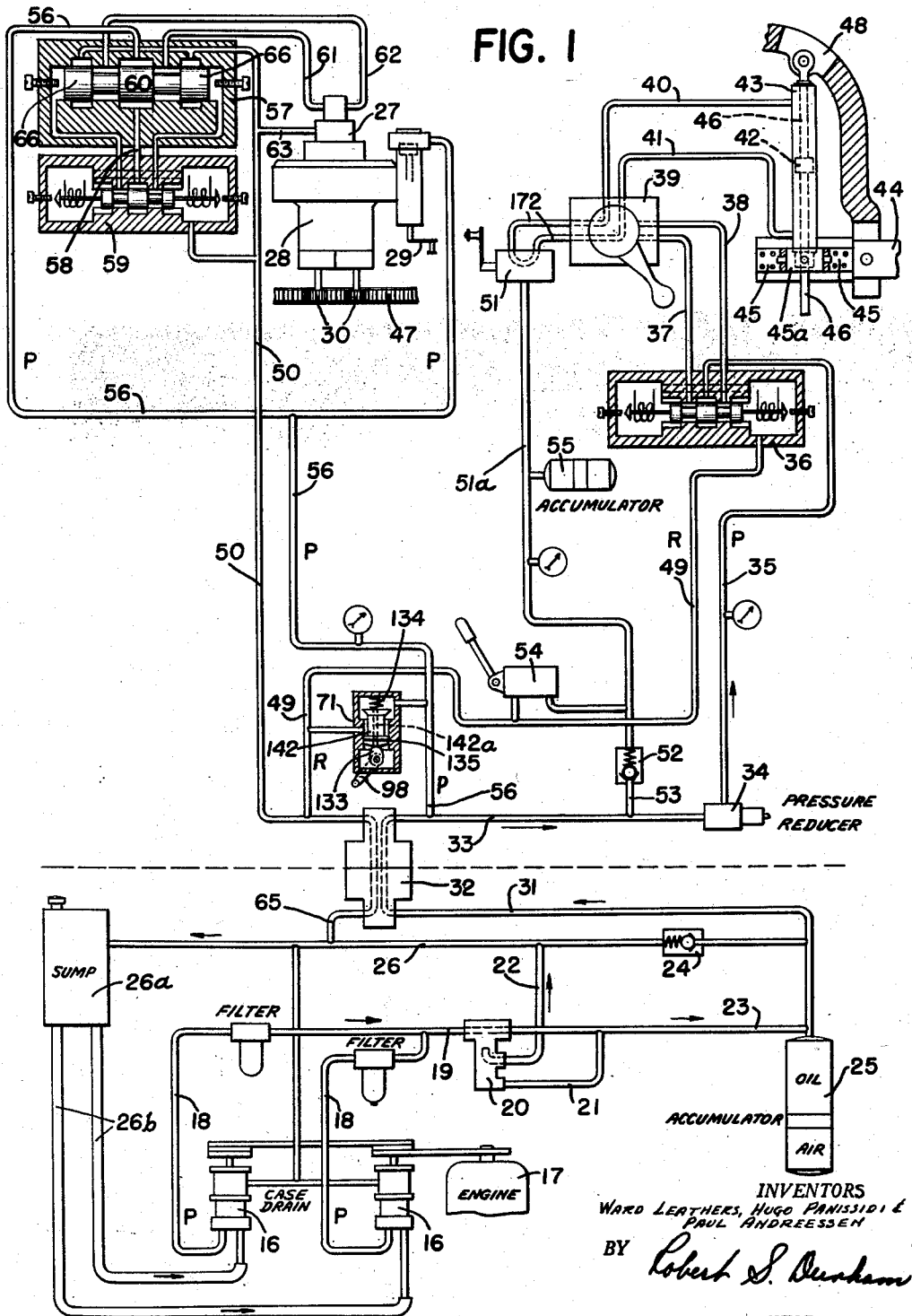
Figure 1 is a schematic diagram of a hydraulic system of the present invention.

In describing a specific embodiment of this invention reference may first be had to Fig. 1 where a hydraulic system is shown. Hydraulic pressure is obtained by means of equipment generally located in the hull of a tank, such hull being indicated below the dotted line. A standard hydraulic power supply is illustrated which consists of two hydraulic pumps 16 being driven by means of belts and pulleys as indicated which connect these pumps to engine 17. This engine may be the main power source for driving the tank or might be an auxiliary engine specifically for obtaining hydraulic pressure. Each pump 16 which receives its fluid from reservoir 26a through lines 26b has a pressure line 18 which leads to a filter as shown, and then by a common line 19 to an unloader 20. This unloader maintains pressure in the hydraulic system at a desired level by means of a pressure line 21, and returns fluid to the sump via line 22 whenever pressure exceeds the desired value. Fluid under pressure is now carried through pressure line 23 to the main accumulator 25, the action of which is well known and will not be described here. There is an overload relief valve 24 which will bypass fluid from the pressure line to the sump via common return line 26 in the event that the unloader fails to maintain the desired pressure and a dangerous pressure condition is imminent. Hydraulic pressure is transmitted to the turret via pressure line 31 and through hydraulic slip ring device 32 to turret pressure line 33. This hydraulic supply system generally is well known in the art and forms no part of the present invention, per se.

There are two separate servomechanisms involved, one of which controls the position of a gun in elevation and the other controls a turret which positions the gun in traverse. Generally, each servomechanism comprises a pickoff mechanism providing alternate timed pulses, the timed duration of which is determined in accordance with the deviation of the position of the gun from the gyroscopic line of reference. The alternating pulses vary in time duration and are complementary to one another, i.e., as one pulse increases in time duration the opposite and next succeeding pulse decreases proportionately in time duration.

These pulses are directed to a controlling unit which generally comprises an electrodynamically actuated primary valve converting the electrical pulses into corresponding hydraulic pulses. These hydraulic pulses are in turn amplified by a secondary valve structure which is actuated by the hydraulic pulses from the primary valve.

The amplified hydraulic pulses, which are alternating in character and variable in time duration as a function of angular error of the gun with respect to the gyroscopic line of reference, are applied to a hydraulic prime mover which serves to actuate or stabilize the gun or turret.

A follow-up device is provided to link the gun with the pickoff mechanism through a differential. The other input to the differential is provided from the control handles. Consequently, aiming of the gun may be completely controlled in both elevation and traverse. Since the gun may be mounted in a balanced state, its elevation position may be controlled by a single hydraulic cylinder and piston, whereas to control the turret in traverse involves the moving of the turret itself and also the gun which is mounted on the turret. Naturally, the turret will be mounted in good anti-friction bearings, but the great mass involved in these very heavy parts means that a heavy duty drive mechanism is necessary to control the turret in traverse. Such a drive is composed of a hydraulic motor 27 which operates through a reduction gear box 28. This gear box may be any desired type, e.g., that disclosed by the patent to Leathers et al. No. 2,475,329, issued July 5, 1949. As there illustrated, there is a manual handle 29 for use in the event of power failure or in stationary firing. In the present instance, however, the electric solenoid operated clutch of the aforementioned patent is replaced by a hydraulically operated one. The change is made by the simple expedient of replacing the solenoid with a hydraulic piston (shown dotted in Fig. 1 of this application) so that the clutch jaws are separated hydraulically instead of electrically as shown in said patent. Drive is effected by means of a pair of driving pinions 30 which engage a large ring gear 47 (a fragment of which is schematically shown) which in turn is fastened to the hull of the tank.

Figure 3:
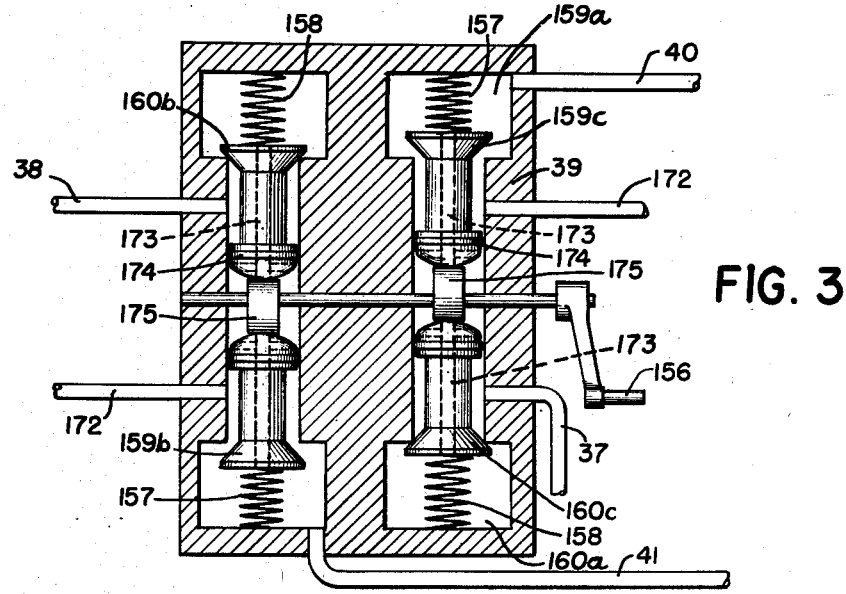
Fig. 3 is an enlarged detail view of a hydraulic selector valve for manual and automatic operation of the elevation controls.

Continuing with reference to Fig. 1, the elevation hydraulic circuit will first be traced. Since the elevation circuit requires less power, a pressure reducing device 34 delivers fluid at somewhat lower pressure to hydraulic line 35. This carries fluid under pressure to the pressure input of the primary valve 36 where the direction of flow of hydraulic fluid to either of lines 37 or 38 is determined. The detailed mode of operation of this valve 36 will be subsequently explained. These tubes carry the fluid to an automatic-manual selector valve 39 which is schematically indicated in this figure. The details of this automatic-manual selector valve are illustrated in Fig. 3 and will be described later.

Assuming this valve 39 is in automatic position (i.e. in the opposite position from that illustrated in Fig. 1) fluid will be transmitted from either line 37 or line 38 to the corresponding lines 40 or 41 in order to determine the position of a gun positioning piston 42 which is carried in a cylinder 43 as illustrated. This cylinder 43 is attached to the framework of a gun 44 by means of a gimbal arrangement consisting of a pair of brackets 45 which carry the lugs of an outer gimbal ring 45a. This outer gimbal ring in turn supports a pair of lugs which are integral with the cylinder 43 at its lower end. It will be noted that the piston rod 46 is carried the full length of the cylinder 43 in any position the piston 42 may assume. This presents equal areas on each side of the piston 42 so that no differential of force exists if the pressures on both sides of the piston 42 are equal. In order to position the gun 44 about its pivots the upper end of the piston rod 46 is pivotally attached to framework of a turret 48 as illustrated.

To return to the flow of hydraulic fluid it will be obvious that when fluid is introduced under pressure to one of the lines 40 or 41, movement of the piston 42 will cause fluid to be returned by the other of these lines. Then the returned fluid is directed by the primary valve 36 to a return line 49 which joins a return line 50 (leading from the azimuth hydraulic motor 27), which line 50 in turn is connected to hydraulic slip ring device 32, by which means the fluid goes to common return line 26 in the hull, via short return line 65 and finally back to the reservoir 26a. The hydraulic slip ring device 32 also includes a number of electric slip rings (not shown) to complete the desired electric circuits from the hull of the tank into the freely rotatable turret.

All gauges in the hydraulic system are joined to the pressure lines through snubbers in order to keep surges of pressure, which are inherent in such a system, from damaging the gauges.

There is provided a manual means for operating the gun elevation cylinder in the event of power shut-off or for use in stationary firing. Such means consists of an auxiliary hydraulic system now described. When the automatic-manual selector valve 39 is in the position illustrated in Fig. 1, a manual, hydraulic pump 51 may be operated in either direction in order to circulate the fluid from one side of piston 42 to the other, thereby causing repositioning of said piston. The handle of this manual pump 51 has included a conventional no-back device (not shown) in order to act as a travel lock and prevent road shocks from spinning the handle, due to reaction, because of the heavy mass of the gun.

In order to eliminate hydraulic backlash, the entire manual elevation hydraulic circuit which consists of the elevation cylinder 43; hydraulic tubes 40, 41, 172, 51a; manual pump 51 and selector valve 39 are subjected to a preload hydraulic pressure. Thus any rotation of the manual hydraulic pump 51 will result in an immediate response of the cylinder 43. Preload pressure may be maintained in this manual control system automatically when power is available by means of check valve 52 which is connected to pressure line 33 by means of line 53. There is also provided an auxiliary hand pressure pump 54, by which preload pressure in this manual control system may be built up to any desired value. This pump 54 takes fluid from return line 49. In the event of power shut-off there will still be sufficient fluid available in accumulator 55 to facilitate build-up of operating preload pressure in the auxiliary system.

The traverse hydraulic circuit is fed from pressure line 33 via line 56 which is connected to a secondary valve 57. A pressure line 58 is carried from the secondary valve 57 to another primary valve 59. Details of these primary and secondary valves form no part of the present invention per se but will be described more fully in connection with Fig. 4. Such details are included in separate inventions and will be embodied in separate applications. It will be noted that the combination of primary valve 59 and secondary valve 57 acts as a hydraulic amplifier such that large flows to the hydraulic motor 27 may be conveniently controlled from a limited capacity primary valve 59. It will be appreciated that hydraulic fluid flows from pressure line 56 through either line 61 or 62 to hydraulic motor 27, and any leakage from the motor 27 will be returned by the bleed line 63 which joins common return line 50. Actuation of the secondary valve spool 60, which directs the fluid flow as desired, is accomplished by means of end lands 66 which in turn are actuated by hydraulic pulses from primary valve 59 as will be described in more detail with reference to Fig. 4.

Figure 4:
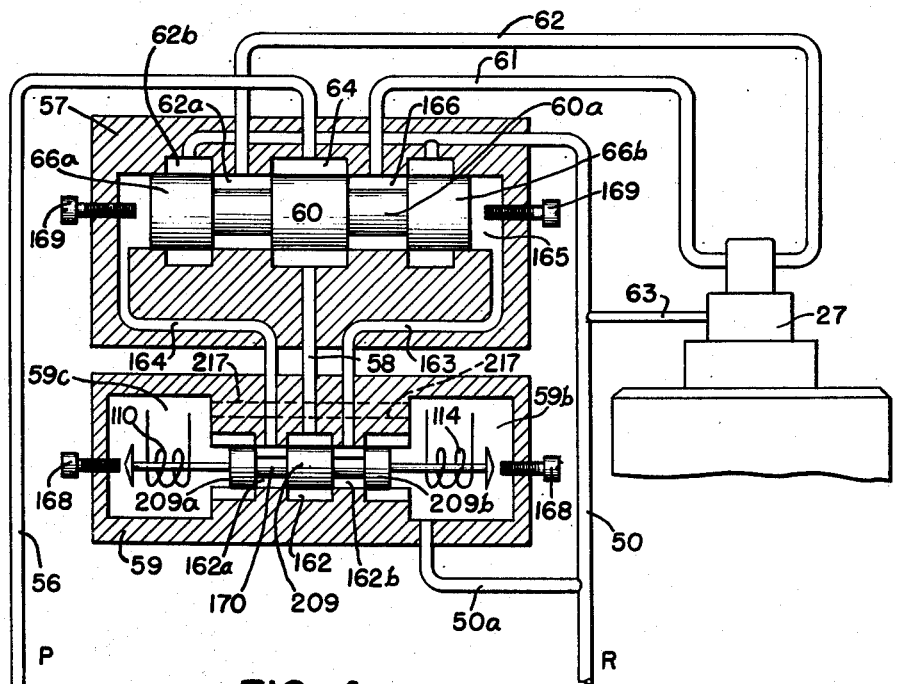
Fig. 4 is an enlarged detail of a secondary or power valve controlling a hydraulic motor, and a pilot or primary valve controlling the secondary valve.

Details of primary valve 59 and secondary valve 57 in relation to hydraulic motor 27 are clearly shown in Fig. 4. Hydraulic fluid is introduced under pressure in line 56 to a center annulus 64. This annulus in the secondary valve sleeve is also joined by hydraulic line 58 which conducts hydraulic fluid under pressure to center annulus 162 of primary valve 59. The hydraulic fluid flow takes place alternately to the right hand and the left hand hydraulic circuits as determined by the position of primary valve spool 170. This valve spool 170 has three lands joined by two reduced portions or undercuts. Central land 209 just fits the center annulus 162 so that no fluid can get by either end of the land 209 to the chambers 162a and 162b around the undercuts of the valve spool 170, when the spool 170 is in its neutral position as shown. When one or the other of coils 110 or 114 are energized, valve spool 170 will be moved to the left or right, respectively (as shown in Fig. 4) against one of the stops 168. Assuming coil 110 is energized, spool 170 will be pulled to the left and fluid may then pass around the right hand end of land 209 into chamber 162b and from there out through hydraulic line 163 to a chamber 165 at the end of right hand land 66b on the spool of secondary valve 57. The pressure built up in the chamber 165 will move the secondary valve spool to the left and so left hand land 66a will cause fluid to be returned via hydraulic line 164 to the chamber 162a in primary valve 59. From this chamber 162a fluid may now pass out around the edge of left hand land 209a into the chamber 59c. The two chambers 59c and 59b of the space inside the primary valve 59 are joined by a hole 217 so that fluid may be returned from either end of the valve 59 by one return line 50a. Return line 50a joins common return line 50 as shown.

The purpose of the limit stops 168 is to create square wave mechanical motion of the valve spool, as will be explained more fully later. The actual amount of travel of valve spool 170 as used in the primary valve is extremely small, being in the order of a few thousandths of an inch, while the actual travel of the secondary valve spool is greater which permits more fluid flow because of the effective increase in orifice area since the valve spool 60a has a larger diameter.

Secondary valve 57 acts similarly to primary valve 59. Assuming the same conditions as previously described for primary valve 59, i.e., coil 110 being energized, secondary valve spool 60a will be moved to the left also, and fluid flow will be directed as follows: from center annulus 64 around right hand end of land 60 to chamber 166, then through hydraulic line 61 to hydraulic motor 27. The other line 62 connected to hydraulic motor 27 acts as a return, since fluid flows from line 62 into chamber 62a and then around the end of land 66a into annulus 62b which is connected to the common return line 50 as shown. The hydraulic motor 27 has a bleed line 63 to allow any leakage to return to the reservoir 26a via the common return line 50. It will be observed that primary valve 59 provides hydraulic pulses which in turn actuate the secondary valve 57, the latter providing amplified hydraulic pulses for actuating motor 27. Attention is also directed to stops 169 which act to produce square wave mechanical motion of the secondary valve spool 60a in like manner to that produced by primary valve 59. The purpose of the limit stops 169 is to eliminate overtravel of the secondary valve spool 60a and obviate harmonic motion thereof and permit the valve to be more quickly returned in the opposite direction.

Returning to Fig. 1, there is a hand-operated bypass valve 71 which will render both elevation and traverse hydraulic systems, previously described, inoperative, if it is in bypass position as illustrated. A purpose of this bypass valve is to short circuit the hydraulic control systems when desired, e.g., during engine starting periods or when the stabilizer is not used. The valve 71 is a poppet type and is operated from open position as illustrated to closed position by means of a handle or arm 98. This arm operates in unison with and is joined to a cam 99 (Fig. 2) which in turn is operated in the electrical system as will be described later. When arm 98 is moved 90° counterclockwise from the position shown, cam 133 is also rotated a like amount and the valve will be closed by the action of a spring 134. It will be noted that there is an O ring 135 (which may be any type of oil seal found to be desirable) at the base of valve poppet 142. There is also a through passage 142a, in the poppet in order to equalize the pressure on both ends in a conventional manner. This is the same as the through passages shown in the poppets of Fig. 3 which are shown in a larger scale and which are described later. The action of this bypass valve 71 when open is to allow the fluid to go directly across from pressure line 56 to return line 49 and so rob the entire control system of operative pressure leaving it inoperative unless this poppet valve 71 is closed.

Fig. 3 illustrates the details of the automatic-manual valve 39 which was schematically illustrated in Fig. 1, but which may be a type illustrated in Fig. 3. Handle 156 is shown in its manual position such that diagonally located springs 157 are compressed and the other pair of springs 158 are extended, which means that poppet valves 159b and 159c are open while poppet valves 160b and 160c are closed. The result is that hydraulic lines 172 which connect to the manual pump 51 (Fig. 1) are effectively connected to lines 40 and 41 which lead to hydraulic elevating cylinder 43 (Fig. 1). When handle 156 is rotated either direction to the upper position in its rotational circle (180° from the position shown), poppets 159b and 159c will be closed and poppets 160b and 160c will be opened so that hydraulic line 37 will be connected to hydraulic line 40. The path of the hydraulic fluid will be from line 37 down past poppet 160c (now open) into chamber 160a, then by means of through bores 173, up into chamber 159a to which line 40 is connected. (Line 172 is not connected into this path of hydraulic fluid because poppet 159c is now closed.) In a similar manner hydraulic line 38 will be connected to hydraulic line 41, for automatic operation of the elevation stabilization and control system.

The through bores 173 of poppets 159 and 160 are used to hydraulically balance the poppets by permitting equal pressure on both ends of the poppets. Each poppet also has an O ring 174 or some other appropriate type of seal to cause the desired valve action in a conventional manner. Valve operating cams 175 are so designed that when a shift is made from automatic to manual or back again, whichever pair of valves is open will close before the other pair opens. The reason for this is to shift over without losing pressure at elevating cylinder 43 (Fig. 1) and to hold the gun in a definite position during changeover. It will be apparent that this automatic-manual valve is a means for connecting either electrically controlled primary valve 36 (Fig. 1) or manual pump 51 (Fig. 1) to cylinder 43 (Fig. 1) for operation of the elevational control piston 42 (Fig. 1).

Details of the construction of primary valves used in the present system are illustrated in Figs. 5, 6 and 7, where the important elements will be described. These details, per se, are not part of this invention but are the subject of a separate application, Serial No. 399,683, filed December 22, 1953. The hydraulic valve itself is located at the center of the primary valve structure and consists of valve ports and lands similar to those illustrated and described with reference to Fig. 4. A pressure line (not shown) is connected to a pipe tap 187 shown in dotted lines at the top of Fig. 5, and carries fluid to the center section by means of a drilled hole 188 and a disc-like groove 189. Fluid is transferred upon actuation of the valve spool 170 to the right or to the left as viewed in Fig. 5. If the spool is moved to the left, center land 209 opens a passage around its right hand edge which allows fluid to flow from center annulus 162 into the space around right hand undercut 162b of spool 170 (as viewed in Fig. 5). This undercut (162b) is connected to a control passage 210 by means of another disc-like slot 211. Fluid may then flow through the control passage 210 and a connected hydraulic line (not shown) to a hydraulic amplifier or secondary valve such as a valve 57 (Figs. 1 and 4), or directly to a hydraulic cylinder such as elevation cylinder 43 (Fig. 1). Fluid will, of course, be returned from the cylinder or the secondary valve, via another connected hydraulic line (not shown) and control passage 212 (Figs. 5 and 6) and a third disc-like groove 213 to an undercut 162a of spool 170. From the space around this undercut 162a, since spool 170 has been moved to the left, fluid may flow out of the space around the edge of left hand land 209a, through the four clover-leaf shaped openings 214 into the whole space within casing 215. It is pointed out that the valve spool 170 is constructed and acts as was indicated in the schematic showing which was explained with reference to Fig. 4, i.e., central land 209 just matches the central annulus 162 so that no fluid may pass by either end of the lend 209 when it is in its neutral position. Also, end lands 209a and 209b are so proportioned adjoining the edges of undercuts 162a and 162b so that no fluid can pass out of the spaces around these undercuts 162a and 162b through the clover-leaf shaped orifices 214 into the chambers 215a and 215b inside the casing, when valve spool 170 is in its neutral position. There is a hole 216 through the casing 215 which is connected to a return line (not shown) of the hydraulic system. This return hole 216 connects to the left side of casing 215 as viewed in Fig. 5 (which is chamber 215a), so that in order to make a return connection for chamber 215b, which is the right side of casing 215 (same view) there is a hole 217 which connects the right side with the left side. This hole 217 only appears in Fig. 6 because of the location of the views taken.

Positioning of the valve spool 170 is accomplished by means of coils 110 and 114 which are securely fastened to shafts 155 and 154, respectively. Each coil and shaft is joined by means of a spider arrangement clearly shown in Fig. 7. The coil 110 is wound on a short, thin cylinder 218 made of insulating material and securely fastened to a four-spoked, spider 219. Shaft 155 is securely fastened to the hub of spider 219, while the spider 219 is securely fastened to a diaphragm 220. The diaphragm 220 is clamped between a pair of rings 241 made of insulating material and held together by four screws as illustrated. These rings 241 are held in place on the electrodynamic drives by three screws 242 which screw into a soft iron pole piece 243. It will now be clear that electrodynamic reaction is being utilized by having a magnetic core member 244 which is made of magnetic material such as soft iron and a ring or sleeve 244a of permanent magnetic material such as "Alnico" that produces a strong, permanent, magnetic field, and having a pole piece notched in opposite the other pole piece 243 so that a complete magnetic path exists across the air gap in which coil 110 is carried. Therefore, when current is passed through the coil 110, electrodynamic reaction will move the coil and related shaft and valve spool in the same way as the coil and diaphragm of a loud speaker are moved.

There are adjustable stop pins 163 located in each end cap of the primary valve. These stops are to limit the amount of travel of the valve spool 170 in order to clip the movement and so produce a corresponding square wave motion of the valve spool 170.

Figure 10:
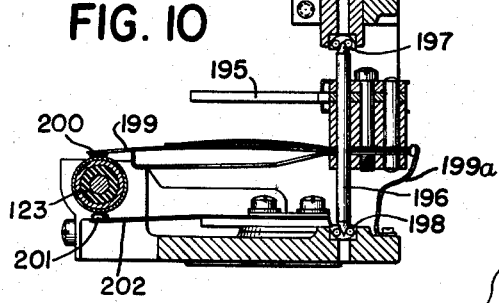
Fig. 10 is a side elevation partly in cross-section taken on the line 10—10 of Fig. 9.

Fig. 17 shows schematically the relations of the various elements of the two servo systems involved. An important feature in the understanding of the operation of these servo systems is the differential, which in fact is the means by which tracking is superimposed upon mere stabilization control. Any suitable mechanical differential means might be employed but a very simple and reliable one has been used, which eliminates any need for a remote connection between the gun and the pickoff mechanism's elements. This means used is simply that of mounting each of the two gyroscopes directly on the gun with its stable axis properly aligned for stabilizing about the elevation and traverse axes. For example, note the elevation gyroscope unit 370 which is mounted on the side of the gun 44. The gyro unit 370 has a turntable 265 which has the gyroscope and its related pickoff elements mounted thereon. The details of these elements will be described later. It is sufficient to point out here that the gyroscope acts to hold a pickoff contact 200 (see Figs. 2 and 10) in a constant position relative to space. Therefore, if the turntable 265 is rotated about its axis (which is parallel to the trunnion axis of the gun) an error signal will be introduced into the elevation servo system and correction for this error will be made by the elevation cylinder 43. Now attention is direction to the fact that turntable 265 may be rotated in two ways: one, by rotation of the gun about its trunnions which carries the whole gyro unit 370 and turntable 265 contained therein, with it; and two, by rotation of the turntable alone by means of a turntable motor 137 which is mounted on the gun with gyro unit 370. It is these two ways of rotating the turntable which constitute the two inputs of a differential, the output of which is the rotation or non-rotation of turntable 265. By way of illustration of the differential action, suppose turntable motor 137 is energized and so the turntable 265 is rotated. An error signal will be set up by the pickoff elements in a manner to be described and so the gun will be rotated about its trunnion axis by the cylinder 43. This rotation of the gun will be in the opposite direction from that taken by the turntable 265 and will tend to return the turntable to its original position or at least stop its initial rotation so that the gun will continue to rotate as long as the turntable 265 is being driven by its motor 137. This is the situation when tracking is being introduced. When stabilization alone is being effected, rotation of the gun about its trunnion axis will rotate the turntable 265 with it and this will cause an error signal to be set up as before. In this case the error signal will cause the servo system (by means of the cylinder 43) to return the gun to its original stabilized position as determined by the gyro maintained position of the turntable 265.

The same action takes place about the traverse axis where there is a traverse gyro unit 371 which is mounted on the gun with its stable axis parallel to the vertical or traverse axis of the turret. The action is in all respects the same as that described for the elevation axis. The only difference lies in the type of motor used with the servo system, which is as illustrated, a hydraulic motor 372 which drives through a gear box 373 and a pair of pinions 374 to an internal ring gear 47 located on the hull of the tank. In this manner 360° of rotation in traverse may be had.

Figure 2:
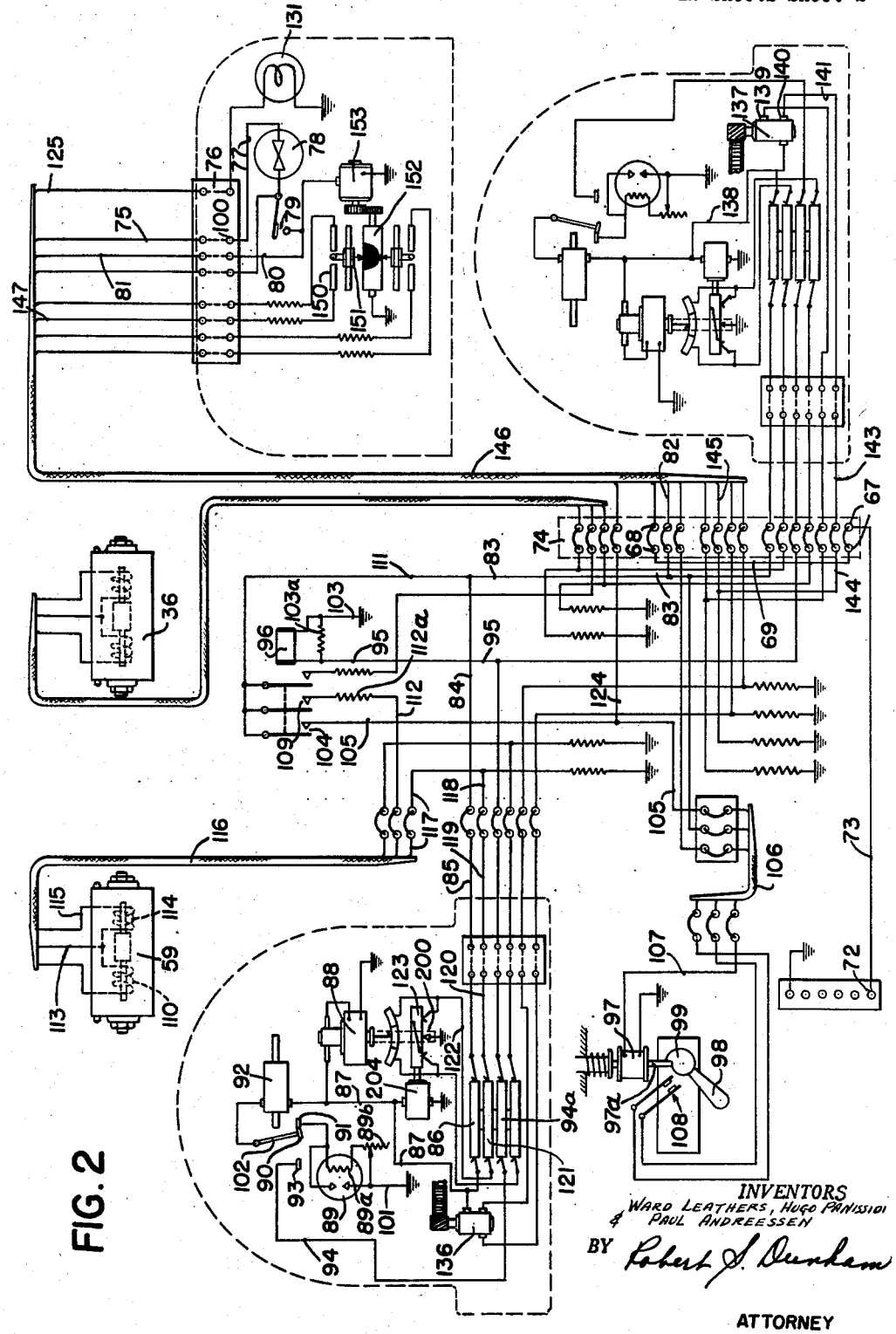
Fig. 2 is a schematic electrical circuit diagram of a system of this invention.

Gyroscope control of both the elevation and azimuth servos is obtained by means of the electrical system illustrated in Fig. 2. Each of the gyro systems for controlling traverse and elevation servos are similar and only one will be described in detail. Electrical power for operation of the system is supplied by means of the vehicle's low voltage D.C. supply (not shown) one side of which is connected to output terminal 72 and the other side of which is connected to ground. There are slip rings (not shown) for making electrical connections from the hull to the turret of the vehicle, as was previously mentioned in connection with the hydraulic slip ring device 32 (Fig. 1). One of these slip rings carries the main circuit for the direct current power source which is the D.C. supply mentioned. Another of these slip rings carries the return or grounded side of this same D.C. supply. In this case ground would be the hull of the tank, the framework of the turret, etc. A supply wire 73 carries power to a terminal board 74. At this board electrical connections are made which carry power on from terminals 67 to terminals 68 via wire 69. From terminal 68 power is carried over a connected wire of cable 146 to wire 75. Wire 75 leads to terminal 100 on terminal board 76. Terminal board 76 is conveniently located near the manual control handles (illustrated in Fig. 12) which operate to introduce a superimposed control of the gun and turret upon that control had by the gyros alone. From terminal board 76 the power is carried via wire 77 to a fuse 78 and thence to one side of a switch 79. Switch 79 is the operator's switch by which the electrical system is energized.

When the operator desires to energize the gyro control systems, he closes switch 79. Since each of the elevation and traverse servo systems are electrically alike only one of them will be traced through its circuit operation. Closing switch 79 will energize wires 80, 81, 82, 83, 84, 85 and gyro slip ring 86 to common wire 87. Now that common wire 87 is energized, gyro motor 88 will be energized and the gyro flywheel will be brought up to speed. In order to provide sufficient time delay for the gyro motor to attain required speed, there is a thermal time delay switch 89. A detailed description of such a time delay switch may be found in U.S. Patent No. 2,521,379, issued to Leathers et al. on September 5, 1950. Such details are not necessary for an understanding of this system. This time delay switch is energized by the following circuit: energized wire 87 to caging solenoid 92, through the coils (not shown) to caging solenoid 92 and through the normally closed contacts 90 and 91, which are controlled by the caging mechanism. Details of the caging mechanism may also be found in the aforementioned U.S. patent to Leathers et al. No. 2,521,379. Energization of this time delay switch 89 is completed by the connection of its heating coil 89a to ground via the variable resistor 89b by means of wire 101. The amount of current drawn by this heating circuit is not sufficient to cause caging mechanism 92 to operate, however; operation of caging solenoid 92 does not take place until contacts of thermal time delay switch 89 are closed. When these contacts are closed sufficient current passes to operate caging solenoid 92 in a positive manner. Solenoid 92 uncages the gyroscope flywheel and at the same time throws a switch 102 which carries contact 90 to its other position, and completes a circuit via contacts 90 and 93. This completed circuit is a holding circuit and may be traced via wire 94, the gyro slip ring 94a, and the circuit shown to wire 95 and resistor 103a to ground. By this means relay 96 is energized, since it is connected across resistor 103a. The purpose of resistor 103a is to limit the current to a value sufficient to hold caging solenoid 92 operated but not enough to cause the solenoid to heat up.

At this time attention is drawn to the fact that when common wire 87 is energized by means of closing operator's switch 79, gyro motor 88 and pickoff motor 204 are each energized since their other terminals are connected to ground as shown. Manually controlled turntable motor 136 is reversible depending upon which of two internal circuits is energized. These internal circuits have a common terminal which is also connected to energized wire 87 so that this motor 136 is now prepared for operation when its control circuits are completed in a manner to be clearly described with reference to Fig. 12. These circuits may readily be traced on Fig. 2 if desired.

A safety circuit is provided so that the hydraulic control systems cannot be turned on until the electric system has been energized for the required time to allow the gyro flywheel to come up to speed. The energization of electromagnet 96 causes latch 97a to release the handle 98 permitting the hydraulic system to be turned on. (Note the electromagnet 96 does not operate until after the required time delay as determined by thermal time delay switch 89.) The circuit which accomplishes this unlatching may be traced as follows: wire 83 (which was energized by closing of operator's switch 79), wire 111, contacts 104 (now closed), wire 105, cable 106, wire 107, electromagnet 97, to ground, as illustrated. In this connection it is pointed out that handle 98 which carries latching cam 99 also carries cam 133 of bypass poppet valve 71 (see Fig. 1). This then constitutes a safety circuit whereby the hydraulic system may not be energized without the electrical system being also energized at the same time. This is accomplished by means of a switch 108 which is closed by cam 99 when the hydraulic bypass valve is closed (since moving handle 98 about 90° counterclockwise also moves cam 133 (Fig. 1) the same amount, the hydraulic bypass poppet valve 71 (Fig. 1) will be closed when cam 99 closes switch 108). Closing of this switch 108 introduces a parallel circuit which is across the contacts of operator's switch 79 so that switch 79 no longer has an effect as long as switch 108 remains closed. An important feature of this safety system is to eliminate inadvertent turning off of the electrical system by means of switch 79 while the hydraulic system is energized, since this would leave an uncontrolled hydraulic system in operation. Turning the handle 98 from hydraulic "on" position to hydraulic "off" position will open contacts 108 and cut off the electrical system, provided the operator's switch 79 is open.

Alternate timed pulse control of the pilot valves 59 and 36 will be made clear with reference to later figures. However, the electrical circuits will be now traced with reference to Fig. 2. When relay 96 operates, its contacts 109 will be closed and the electrical supply will be carried from previously energized wire 83 to wire 111 and via the contacts 109 to wire 112, through a current limiting resistor 112a, cable 116 and wire 113 to the mid or common connection for coils 110 and 114 of primary valve 59. These coils may then be selectively energized by means of the circuits shown, one of which will now be traced. The power source having been traced to wire 113, a return circuit for the right hand coil 114 may be traced as follows: wire 115, cable 116, wires 117, 118, 119, wire 120, gyro slip ring 121, wire 122, right hand segment of commutator drum 123 (as shown in Fig. 2) of pickoff mechanism to ground via contact 200. Energization of this circuit will cause primary valve 59 to be operated to one of its extreme positions, which in this case would cause the secondary valve 57 (Fig. 1) to be operated to send fluid to hydraulic motor 27 (Fig. 1) for operation in a given direction. By means of pickoff commutator drum 123 and its associated contacts (the contact 200 that is connected to ground is mechanically linked to a gyroscope) energization of each of coils 114 and 110 of the primary valve takes place alternately.

When relay 96 is energized, an auxiliary circuit is also energized by the closing of contacts 104. This is the circuit supplying a signal light 131 which may be readily traced from contacts 104, to wire 105, wire 124, cable 146, wire 125, to the signal light 131. When this signal light is energized, it gives a visual indication that the electric automatic control system is energized and is in working condition.

In order to introduce tracking control when the automatic systems are energized, differential means are provided to position the turntables of the gyroscopes. One input of such means constitutes in each case an electric motor shown at 136 and 137 in Fig. 2. It is important for understanding the nature of the differential means here involved, to note that the turntable in each case carries the continuously rotating commutator drum 123 thereon. Therefore, when the turntable is rotated by its motor, the commutator drum will be moved laterally relative to contact 200, and hence a differential in the time duration of successive pulses will be introduced which in effect is a tracking signal to cause the gun to be repositioned about one of its axes. The control circuits for these motors (136 and 137) are identical and only one will be described in detail. These same circuits are shown in Fig. 12, but will be described here in reference to Fig. 2 in order to make clear the physical relation of the elements. Turning of these motors is accomplished to a degree by means of make and break speed control. The energization of motor 137 may be traced beginning at wire 138 which is connected directly to the source of power in the same manner as was described in detail with respect to wire 87 of the traverse gyro system (which contains turntable motor 136). Motor 137 is reversible depending upon which of the two circuits connecting terminals 139 and 140 is used. In order to trace one of these circuits, we may choose terminal 140 and follow the circuit via wire 141, wire 143, wires 144, 145, cable 146, wire 147, to contact bar 150, from contact bar 150 via sliding contactor 151 and rotating contact drum 152 to ground. The operation of sliding contactor 151 will be more fully described with reference to Fig. 12. It will be noted that motor 153 which drives rotating contact drum 152 is energized upon closing of switch 79.

Figure 8:
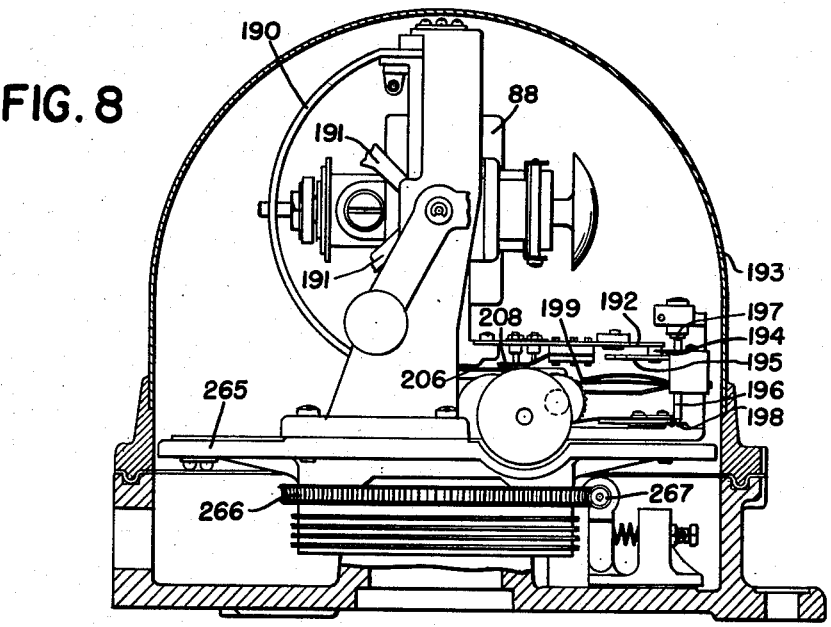
Fig. 8 is an enlarged detail elevation, partly in cross-section of a gyroscope of the type used for automatic control.
Figure 9:
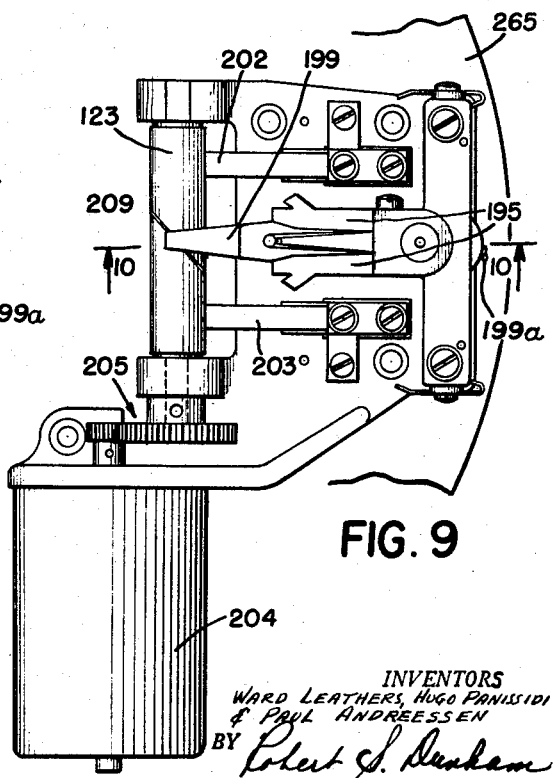
Fig. 9 is an enlarged detail plan view of an alternate timed pulse pickoff mechanism, and the gyro turntable upon which it is mounted.

The gyroscopes used in this system may be any convenient type. However, we contemplate using gyroscopes having two degrees of freedom generally of the type disclosed in the patents to Leathers et al. Nos. 2,521,379 and 2,464,592. Such a gyroscope is illustrated in Fig. 8 and consists of a gyro flywheel 88 driven by an electric D.C. motor (not shown) which is supported in gimbal rings in the usual manner. There is also a caging mechanism which consists of a pair of jaws 190 and also jaws 191 which are only fragmentarily shown. The gyro flywheel 88 by virtue of gimbals in which it is mounted carries with it an arm 192. The position of the arm 192 relative to a turntable 265 (upon which the gyro gimbals and the commutator, pick-off and associated mechanism are located) is an indication of deviations in either traverse or elevation depending upon which gyroscope is being considered. The turntable 265 may be rotated relative to gyro casing 193 by means of a worm wheel 266 and a worm 267. Worm 267 is secured to the shaft of a tracking motor (not shown) which is illustrated by reference numbers 136 and 137 in Figs. 2 and 12. Such a tracking motor is fastened to the casing 193 of the gyroscope which in turn is fastened to the gun with the gyro axis properly oriented to produce the desired reference axis (traverse or elevation). Now it will be clear that the gyro turntable 265 may be rotated by either its tracking motor, or by motion of the gun about the axis being considered which will rotate the whole casing 193 and consequently the turntable 265 with it. Arm 192 carries at the extremity thereof, a pin 194 which engages a slot in a fork-shaped arm 195 which is more clearly seen in Fig. 9. This arm 195 is carried by a shaft 196 which rotates in needlepoint bearings 197 and 198. There is a contact carrying arm 199 which is also fastened to shaft 196 and moves with arm 195. At the end of pickoff arm 199 a contact brush 200 (see Fig. 10) is carried. This brush makes contact with the continuously rotating pickoff commutator drum 123. There is a pigtail connector 199a (Fig. 10) which makes electrical connection from arm 199 to the frame in order to complete a circuit to ground and avoid the necessity for the needlepoint bearings to carry any appreciable electric current. There are two other takeoff contact brushes, one of which may be seen in Fig. 10, and is indicated by reference numeral 201. These brushes are carried at the ends of contact strips 202 and 203. The electrical circuits in which these elements are contained are shown in Fig. 2 and have been there described. There is an electric motor 204 which drives pickoff commutator drum 123 by means of gears generally indicated at 205. It is pointed out that pickoff commutator drum 123 is composed of two surface sections which are separated by insulating material 209 and which are insulated from the shaft which carries the drum 123. As will be more fully explained, this affords the means for alternately completing circuits from contact strips 202 and 203 to ground via pickoff contact arm 199.

Figure 11:
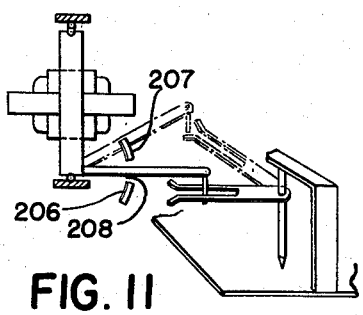
Fig. 11 is a schematic perspective view showing operation of an alternating timed pulse pickoff mechanism by a gyro and also indicating the location of carry-over contacts which are effective whenever extreme positions are indicated by the gyroscope.

There is a provision for auxiliary circuits in parallel with the alternately energized circuits which are completed by the pickoff commutator drum and its contact arms 199, 202 and 203. These parallel circuits come into use in cases where extreme movement of gyro arm 192 takes place. These auxiliary circuits are embodied in contact sectors 206 and 207, and contact brush 208 illustrated in Fig. 11. Auxiliary contact brush 208 is carried beneath arm 192 (see Fig. 8 also) and makes contact with either of sectors 207 or 206 as is schematically illustrated in Fig. 11.

A mechanism for introducing tracking control upon automatic gyro control, consists of two manual handles 221 and 222 schematically illustrated in Fig. 12. Handle 222 is arranged to control the elevation tracking circuits while handle 221 controls the traverse tracking circuits. Handle 222 is securely fastened to the framework 223 and carries at its upper end a knurled thumb wheel 224. This wheel carries a disc which rotates with knurled wheel 224 and which carries an eccentric pin 226. Eccentric pin 226 is joined by connecting link 227 to a similar eccentric pin 228 which is carried by another disc 229 which in turn causes the beveled gear 230 to rotate with it. This gear 230 meshes with a similar beveled gear 231 which in turn carries a crank arm 232. Crank arm 232 is connected to sliding contactor 151 by means of an insulated connecting rod 234. This connection is illustrated more clearly by referring to the similar insulated connecting rod 235 located on the other sliding contactor for traverse control. It will be noted that gyro positioning motor 137 which rotates the turntable of the gyro is controlled by the circuits in connection with sliding contactor 151. These circuits are the same as those described with reference to Fig. 2 but simplified. It will thus be made clear how the manual control action gives a fine adjustment of the position of the gyro turntable, and by this means introduces the desired manual control through the automatic control system. There is a continuously rotating contact drum 152 which is made up of two sections, each of conducting material, separated by a strip of insulating material 237 shaped as illustrated. By this means, when thumb wheel 224 is rotated, the connecting linkages described will cause sliding contactor 151 to move to the left or right from the position illustrated and thereby complete (for various intervals each cycle) either one of the two circuits to motor 137 as illustrated. Motor 137 is a reversible motor, the direction of rotation of which is determined by which of its two circuits is energized. Therefore, if the sliding contactor 151 is moved to the left so that contact 238 completes a circuit to contact strip 150, the circuit for a given direction of rotation of motor 137 will be completed up to contact brush 240. Then a circuit to energize motor 137 for a given direction of rotation will be intermittently completed, and the duration of these intermittent completions will vary with the position of sliding contactor 151 away from the neutral position shown. Because of the configuration of insulating strip 237 on contact drum 152, a small displacement of sliding contactor 151 will complete the circuit for energizing motor 137 just described, for a short time during each revolution of the contact drum 152. Greater movements of sliding contactor 151 will produce an increased time duration of circuit completion until the extreme condition is reached where the circuit will be continuously completed. By this means a fine motor speed adjustment may be had. The fine motor speed adjustment desired and obtained by means of this arrangement is such that the motor 137 is variable in speed from a very slow rotation (hardly more than a tendency to rotate) to full speed. Thus a very fine tracking control may be superimposed which correspondingly varies from a creep to high speed turning.

Similarly, the traverse control circuit controls the speed of rotation of gyro turntable motor 136 in either direction of rotation. Motor 136, of course, turns the traverse control gyro turntable and hence introduces tracking control of the traverse positioning system. The manual elements for this control system are somewhat different from those controlling the elevation system and are as follows: handle 221 which rotates in its bearings about a vertical axis, as shown, and turns shaft 246. This shaft carries a disc 247 at the end thereof which has an eccentric pin 248 and which in turn is joined by the insulated connecting rod 235 to sliding contactor 249. Rotation of handle 221 therefore completes alternative circuits for reversible motor 136 in a similar manner as that described for the elevation motor 137.

When the gyro pickoff commutator and its support are shifted by the tracking motor relative to the pickoff contact, then an error is introduced directing the servomechanism with its follow-up to reposition the gun to again return the pickoff commutator to its initial or neutral position relative to the pickoff contact.

The action of this alternate timed pulse system may best be explained with reference to Figs. 13 and 13a–d. Fig. 13 shows a schematic of the basic elements which comprise important features of the present invention. These elements are: the coils (110 and 114) of a primary valve which are connected to a source of direct current as shown, the primary valve including stops 168 which convert the motion of the valve spool into square wave motion, the commutator drum 123 which is connected electrically to coils 110 and 114 as shown, and the gyro positioned arm 199 which carries contactor 200 (Fig. 10) at its tip and which is grounded as shown to complete the electrical circuits. The commutator drum 123 is rotated at a desired speed, approximately 50 cycles per second. It will be appreciated that one cycle will consume about twenty milliseconds and therefore each half cycle will be about ten milliseconds long. Fig. 13a shows the surface of commutator drum 123 unrolled so that the commutator action will be clear. The surface of drum 123 is made up of two segments having an interlocking shape as shown. Each segment is made of some conducting material such as platinum, and the two segments are separated by insulating material 209 as well as being insulated from the shaft of the drum. Under normal conditions, i.e., when no error is present, the gyro controlled pickoff contactor 200 (Fig. 10) will be riding at the center position (along line B—B of Fig. 13a) so that it will make contact with each of the two conducting materials on the pickoff commutator drum surface 123 for equal lengths of time.

Therefore, when the pickoff contactor 200 completes the right hand circuit, coil 114 (Fig. 13) will be energized. The character of energization is that illustrated by the pulse 233 in Fig. 13b. Then conversely when the contactor 200 completes the left hand circuit, coil 110 will be energized, and the character of its energizing pulse is that illustrated by pulse 236 which occurs during the alternate half cycle. Two wave patterns are shown in this figure (13b); they both represent current against time as indicated. These wave patterns correspond to the dwell time of the contactor 200 on each segment of the surface of drum 123. The upper curve marked "R" shows the electrical response in the right hand circuit which includes coil 114, while the lower curve marked "L" shows the electrical response in the left hand circuit which includes coil 110. It will be noted that one complete cycle includes first a pulse in one of the circuits and then a pulse in the other so that they are alternately energized. The initial current drop 250 is the result of the counter E.M.F. occasioned by the coil moving in a magnetic field during its excursion from one extreme stop to the other.

It will be appreciated that when no error signal exists, contactor 200 will be riding at the neutral position of the pickoff commutator as represented by line B—B of Fig. 13a and the pulses of power applied to the gun about the axis being considered, will be equal in time duration and alternating in character. When the magnitude of angular error exceeds the rated portion of the pickoff commutator one of the primary valve coils 110 or 114 will be continuously energized to the exclusion of the other until the error is reduced to within the rated portion of the pickoff commutator and finally returned to its neutral position by the action of the servomechanism.

Figures 13c and 13d show the current curves or dwell times of the same right and left hand circuits which include coils 114 and 110 respectively. These figures illustrate conditions when the error is such that contactor 200 is traveling along the path of the lines C—C and D—D shown in Fig. 13a. Fig. 13c corresponds to the path of travel shown by line C—C while Fig. 13d corresponds to the path of travel shown by line D—D (Fig. 13a). It will be appreciated that conditions illustrated by Figs. 13c and 13d will exist for angular errors of a given magnitude.

A celestial line of reference is based upon coordinate reference lines namely an elevation line of reference established by the elevation gyro and a traverse line of reference established by the traverse gyro.

Any deviation from either line of reference introduces an error and accordingly a correction is provided by the associated servomechanism to restore the position of the gun to this established line of reference.

During tracking periods, the position of the gun may be displaced from this celestial line of reference by introducing an angular error based upon the relative displacement of the turntable and the gun, by means of a tracking motor.

This angular error is reduced to zero when the gun is driven to its new position by the action of the servomechanism in a manner to restore the pickoff mechanism to its neutral or no error position.

The action of each servo system is controlled by the gyroscopes. The celestial lines of position of the two axes of the gun are maintained each by a separate gyroscope in the ordinary way as described above. When there is no variation from these axes the turntable 265 and commutator drum 123 (see Fig. 9) are held in neutral position and so contactor 200 travels over the surface of commutator drum 123 along the line B—B (Fig. 13a). If, however, there is a "signal" because of a variation from the stabilized position of the gun or because of the introduction of a different stabilization position (tracking control being introduced), the gyro controlled pick off arm 199 holds the position of the contactor 200 (at its tip) steady while the turnable and commutator drum 123 are rotated with respect thereto. Consequently, there is introduced a differential in the time duration of the alternate pulses of energy being produced by the hydraulic system. It is the time differential between pulses in opposite directions which produces a movement of the gun about the axis under consideration.

It is this alternate timed pulse control which provides superior stabilization. The rapid recovery effect is gained by reason of the fact that as a position of zero error signal (or correspondence) is approached, the reverse pulses are increasing in duration and hence effectiveness until, at zero error or correspondence position, the pulses in both directions are of equal duration. This means that any tendency to overshoot is reduced to a minimum by the reverse energy being applied throughout the control range.

If the alternating pulses are of equal duration an equal amount of hydraulic fluid will be introduced on each side of the system at alternating times and there will be no change in position of the gun or turret. On the other hand, if the pulses on one side predominate for a greater length of time than the pulses on the other side, there will be a transfer of fluid for a greater time duration on the side where the time duration of the pulses is augmented. This augmented transfer will correspondingly reposition the gun or turret. The more the pulses are augmented on one side the greater will be the repositioning of the gun or turret. If equal power is applied on both sides, there is no repositioning of the gun or turret, accordingly back lash will be eliminated and good floating control obtained. If the power on one side predominates over the power on the other side, there will be repositioning of the gun or turret at a rate and for an extent depending upon the differential in power along with repositioning of the gun or turret, back lash elimination and good floating control being concurrently obtained.

Now it will be evident that the alternate timed pulse system of control disclosed varies the power with respect to time rather than by amplitude variation. The benefits from this type of control are those already mentioned which include a freedom from disturbing effects due to any variations of system pressure in the hydraulic system, within reason. It is this fact that allows the hydraulic pump or pumps to be driven by the tank's engine which has extreme variations in speed. The hydraulic pressure is of course held to a certain range by conventional means but the range is of sufficient magnitude that all other systems which use amplitude modulated signals find it necessary to use an auxiliary means to drive their hydraulic pumps in order to keep the pump speed constant.

In Figs. 14, 15a and 15b there is shown a more recent system according to this invention which embodies some improved elements but which employs the same basic alternate timed pulse stabilization and control system. To describe this system we may begin with a description of the hydraulic pressure supply system as illustrated in Fig. 14. An engine 280 is the main engine for driving the tank. It has a take-off to a hydraulic fluid pump 281 by means of a clutch 282. This clutch may be any desired type which is adapted to be operated hydraulically. A preferred type of clutch is that shown which consists of the ordinary disc type clutch. It has a drum member 283 which is driven by a shaft 284 taken from the tank engine 280. The drum member 283 is carried in bearings as shown and carries with it two discs 285 and 286. These discs are splined to drum member 283 for positive rotation therewith. A third disc member 287 is splined to an output shaft 288 of the clutch. The shaft 288 is carried in appropriate bearings as shown and is coupled to the hydraulic pump in an appropriate manner. The clutch 282 is actuated by means of a ring type piston 289 which is carried in an annulus 290 and may slide laterally therein. The ring 289 carries appropriate seals as illustrated and is actuated to slide laterally by means of hydraulic fluid introduced through hydraulic pipe 305. When hydraulic pressure is introduced into the annulus 290 from hydraulic pipe 305, ring 289 is forced to the right as shown in Fig. 14 and therefore applies lateral pressure by means of bearings 306 to the discs 286, 287 and 285. Such lateral pressure on the discs forces them into frictional engagement since they may slide laterally on their splines, and such frictional engagement produces a direct coupling from engine shaft 284 to clutch output shaft 288 in the ordinary manner of a disc type clutch.

Operation of the clutch is controlled by means of an electrically actuated hydraulic valve 307. This valve consists of a ball 308 which is spring biased into the position shown by means of a rod 309 and a spring 325. There is a guide (not shown) to keep the ball in line with the rod. When the ball is held in the position shown, it closes hydraulic input pipe 326 which is connected to the main pressure line 338 of the hydraulic system. Under such conditions, no hydraulic pressure is applied via pipe 305 to annulus 290 for operation of the clutch and therefore the clutch is allowed to remain disengaged. In order to engage the clutch, there is a solenoid 327 which actuates an armature 328 carried by the rod 309. When the solenoid 327 is energized, it draws armature 328 to the right against the spring pressure of spring 325, and at the same time draws rod 309 to the right allowing ball 308 to be unseated and seated again on the aperture 329 to cause the fluid pressure to be applied directly to hydraulic pipe 305 and thence to annulus 290 and so actuate the clutch. Solenoid 327 is actuated by means to be later described so that the clutch may be actuated at appropriate times. The main purpose for having the clutch is to allow starting of the engine without the extra load of the hydraulic pump. Furthermore, this arrangement avoids driving the pump when dry (because no hydraulic pressure would then be available to actuate the clutch 282) which would be very injurious to the pump. There is a hydraulic pipe 330 which is connected to the inside of valve 307 as shown in order to bleed off hydraulic pressure from the clutch whenever ball 308 is seated against the inlet from pressure pipe 326. The remainder of the hydraulic system shown is conventional and similar to that shown in Fig. 1. Pump 281 receives hydraulic fluid from a reservoir 331 by means of hydraulic pipe 332 and forces hydraulic fluid under pressure out through hydraulic pipe 333 and a filter shown to a check valve 334 and then to a pressure regulator 335. The pressure regulator has connections in the conventional manner to pressure and return by means of hydraulic pipes 336 and 337 respectively. Pressure pipe 338 leading from the pressure regulator joins pipe 339 which is connected to a hydraulic slip ring device 271, the lower portion of which is here illustrated. There is an accumulator 363 which is connected to the pressure side of the system in a conventional manner. There is a relief valve 364 connected across from pressure to return as illustrated. Hydraulic fluid return comes from slip ring device 271 to hydraulic pipe 365, which leads to the reservoir 331 as illustrated.

The remaining portion of the more recent system is shown in Figs. 15a and 15b. Fluid under pressure is introduced from pressure pipe 339 (Fig. 14) to hydraulic slip ring device 271 (Fig. 15a). Fluid is then carried through and sent to hydraulic pipe 272 under pressure as determined by the system pump 281 (Fig. 14) which is located in the hull. Pipe 272 leads to a shut-off valve 273 which energizes the whole control system when it is open.

Shut-off valve 273 is controlled electrically from control box 274 by means of a solenoid 275. It may be observed that main valve core 276 is controlled by a differential of hydraulic forces. Its operation will be clear upon inspection of the drawing when it is pointed out that when the solenoid 275 is energized, the combination armature and rod 277 will push the ball 279 from a return valve seat 279a (as shown) to a pressure seat 279b. This then cuts off system pressure from the back or large area piston integral with valve core 276, so that system pressure opens the valve and holds it open. If, however, the solenoid 275 is deenergized, the ball 279 is allowed to rise off its pressure seat 279b and to seat itself on the return seat 279a, as shown, with the aid of a spring 275a; and then system pressure will be introduced into the auxiliary passage so that the large area piston shown will force the valve core to the left, as shown, and close the valve shutting off the system pressure at this point.

With shut-off valve 273 energized, hydraulic fluid under pressure is introduced in pipe 291 and so carried to pipe 292. This pipe 292 has a filter 293 for the traverse control system which is illustrated in Fig. 15a. On the other side of filter 293, hydraulic pipe 294 leads to a control unit 295 which contains a primary valve 296, a secondary valve 297, and an output bypass valve 298. The primary and secondary valves operate the same way that primary valve 59, and secondary valve 57 did in the earlier system illustrated in Figs. 1 and 4. The bypass valve 298 is pressure operated such that if system pressure falls below a predetermined value, the valve will open, while pressure above the value determined by a spring 300 will keep the valve closed and allow fluid to be transmitted to a hydraulic motor 299 for operation of the same. The operation of this bypass valve will be clear upon inspection. A rod 301 is snugly fitted in a passage shown which is directly connected to system pressure. This rod 301 is integral with a valve core 302 which seats on a passage 303 in order to isolate the two pressure lines shown which lead to hydraulic motor 299. If pressure falls below the predetermined level, spring 300 will act against a piston 304 which is attached to the valve core 302 and will open the valve and create a bypass. The purpose of this bypass valve is to provide conditions such that when manual operation is effected, fluid circulated by the motor 299 (acting as a pump) can freely flow and the resistance to manual operation will be low. Hydraulic motor 299 drives the turret in traverse through a gear box 311, the details of which form no part of the present invention per se.

Traverse gyroscope 312 may be like the gyro unit previously described in connection with Figs. 8 through 11. It is electrically connected to the rest of the system as is indicated in Fig. 15a. There is a commander's handle and control box 313 which is arranged to take over manual control from the gunner's control station 314 (Fig. 15b) by electrical means which form no part of the present invention per se.

The elevation control system is shown in Fig. 15b where its operation may be traced by following first the hydraulic pressure pipe 292 which leads to a filter 315. From this filter 315 we may follow pressure pipe 316 via a flexible connector 317 and hydraulic pipe 318, to an elevation control unit 319. This unit contains a primary valve 320, and a secondary valve 321, like those of the traverse unit 295. This unit also contains a selector valve 322 which operates automatically by means of system pressure to selectively connect either the automatically controlled primary and secondary valves 320 and 321 or to connect a manual hydraulic pump 323, to the gun elevating cylinder 340. The details of this selector valve 322 are evident upon inspection of Fig. 15b and will not be described further than to say that the operation is similar to the manually operated selector valve 39 shown in Fig. 3, except that the poppet valve positioning cam is hydraulically operated.

Gun elevating cylinder 340 is similar to elevating cylinder 43 shown in Fig. 1, but has a larger hydraulic capacity and hence is more powerful. The details of this cylinder form no part of the present invention per se, but are the subject matter of a separate application in the name of Mr. Leathers alone. Hydraulic fluid is introduced to either side of a piston 341, which has a piston rod 342 extending full length of the cylinder above and below the piston 341 in order to equalize the effective pressure areas. There is a bleed passage 343 which operates to vent the space between a pair of hydraulic seals 341a and 341b encircling the piston 341; thereby preventing a pressure lock from developing between the seals rendering them useless, and at the same time permitting the hydraulic seals 341a and 341b to be preloaded when pressure is applied to both sides of the piston as in the case of manual operation. The cylinder 340 is fastened securely to the gun by means of a gimbal arrangement, only part of which is shown, for clarity. Lugs 344 are securely fastened so as to be integral with the top of the cylinder 340. These lugs 344 are in turn carried by a gimbal ring 345 which has lugs on it (not shown) at right angles to lugs 344. The lugs (not shown) on gimbal ring 345 are in turn carried by brackets (not shown) which are fastened to the gun. At the lower end, piston rod 342 has an eye bracket 346, which may be used to fasten the piston rod to the turret framework by any convenient bracket means. Hydraulic fluid is introduced to either side of the piston 341 by means of hydraulic pipes 347, which carry fluid to the gimbal ring 345, and then via sealed swivel joints as shown to a chamber 348 above the piston 341 and to a hydraulic pipe 349 which leads to a like chamber 350 at the bottom of the cylinder 340.

If hydraulic pressure is removed, there is a system provided to manually control the gun in elevation. This system is basically the same as the manual system described in connection with Fig. 1. It may have the same type of manual pressure pump 54, connected to the return side of the hydraulic system to pick up fluid; also, the same type of check valve 52 and accumulator 55, all to supply manual pump 323 with fluid to be circulated thereby. Added to this more recent system, however, is a hydraulic no-back device which is to keep fluid from flowing back from the control system to the manual pump, while allowing fluid to be forced into the system in either direction at any time by the manual pump. This noback device 351 is in effect a dual check valve in which either check valve upon opening holds the other valve open at the same time. The drawing in Fig. 15b shows the parts in a hypothetical position in which fluid is being forced through the left hand hydraulic pipe 352 and returned to the pump through right hand pipe 353. The pressure in pipe 352 has pushed back a ball 354 which is normally urged against its valve seat by a spring 355 and so acts as an ordinary check valve. The same pressure in pipe 352 has forced a piston 356 over to its right hand position. This piston 356 has two pins or rods which are attached as integral parts with the piston and all of which (piston 356 and the pins) move together. The result is that a right hand ball 357, which is likewise spring-biased against its valve seat to act as a check valve, is lifted from its seat and held open. It is to be explained that piston 356 and its pins are so made as to allow both check valves (right and left hand—having balls 357 and 354, respectively) to remain closed when there is equal pressure on both sides of each. The result is that any back pressure developed in the elevation cylinder 340 due to vehicle traveling over rough terrain, will not motor the hand elevation pump 323. In other words, any back pressure from the automatic system in either hydraulic pipe 358 or 359 will be checked at the hydraulic no-back device 351, while any time pressure is applied by means of the manual pump 323, it will be allowed to circulate fluid freely.

Elevation gyroscope 362 may be the same type of gyro as was previously described in connection with Figs. 8–11. The physical location determines its datum line or line of reference so that otherwise both elevation and traverse gyros are identical. The gyro 362 is connected electrically to the control system by electrical lines 362a and 362b as indicated in the drawing.

The setting of a gunner's control switch 365 to its on position, initiates an electrical action whereby the gyroscopes are brought into operation. After a specified time delay to enable the gyro rotor to obtain operating speed, the entire system becomes operative.

A loader's safety switch 360 permits the loader to render the stabilizing system inactive in order to retrieve ammunition from the hull storage compartment. This switch 360 causes the deenergization of the solenoid 275 of shut-off valve 273 (Fig. 15a), and deenergization of solenoid 327 of clutch control valve 307 (Fig. 14), thereby removing pressure from the gun control system and placing the control in an automatic travel lock condition.

A pressure gauge 361 which has a snubber (not shown) integral therewith, is located opposite the accumulator 55 in the manual hydraulic system to show this system's pressure.

Certain features of the improved embodiment of the system according to this invention as illustrated in Figs. 14, 15a and 15b, form the subject matter of a separate application which will be a continuation-in-part of this application. These features generally involve the automatic operation of the changeover and bypass valves as well as the automatic operation of the clutch between the tank engine and the hydraulic system pump. One of the inventors of this separate application is Mr. Frank J. Furman.

*Operation*

The operation of the system of our invention may be summarized with primary reference to Figs. 14, 15a and 15b. These figures illustrate an improved embodiment of our invention, but the principle of operation is the same as that for the first embodiment described and therefore the operation as described will apply to either embodiment.

Beginning with stabilization, it will be noted that the gun 44 (Fig. 17) is to be maintained in a given position which will remain fixed with respect to the earth regardless of the changes in attitude which the body of the tank may assume. Any tendency for the gun 44 to change its position relative to the earth will be sensed by one of the two gyroscopes 370 and 371 (Fig. 17) or gyros 312 and 362 (Figs. 15a and 15b), and the hydraulic control system will be actuated by these gyroscopes in order to cause the relative position between gun 44 and the hull of the tank upon which it is mounted, to change in such a way as to maintain the position of gun 44 (relative to the earth) fixed. The operation will be described with reference only to the system for maintaining gun 44 in a constant elevation position since both the elevation and the traverse control systems are similar and a description of the operation of either one will apply to the other.

When the hydraulic system is in operation following the electric control system having been turned on at the switch 365 (Fig. 15b) on the gunner's control panel, and following the delay period for run up of the gyro rotors to speed, the solenoid 327 (Fig. 14) will be energized and hence the valve 307 will be actuated to cause fluid under pressure, due to the accumulator 363, to cause the clutch 282 to be engaged so that the main hydraulic system pump 281 will be driven by the tank's engine 280. At the same time, solenoid 275 (Fig. 15a) of the cut off valve 273 will be energized and so the valve 273 will be opened to allow the hydraulic system to be energized. Therefore hydraulic pressure will be applied over pipe 318 (Fig. 15b) to the central chambers of secondary control valve 321 and primary control valve 320, as well as to the piston for actuating automatic-manual selector valve 322.

As described in detail above, there is a continuous alternate, cyclic energization of the solenoids which position hydraulic valve 320 (Fig. 15b) at a predetermined constant frequency in such a manner that the valve 320 is being driven against first one of its stops and then the other for equal periods of time. Therefore, the secondary valve 321 is being correspondingly driven from one extreme position to the other at the same frequency, and consequently hydraulic pressure is being admitted first to one side of the elevation piston 341 and then to the other side thereof at a given frequency. This series of hydraulic energy pulses which are applied to the elevation cylinder 340 to reversably drive its piston 341 in opposite directions, will obviously tend to cause the gun 44 to be driven up and down in elevation at the same frequency as these pulses of hydraulic energy. The frequency of the pulses of hydraulic energy is so chosen that the gun will not be substantially displaced so long as the two pulses which make up any given cycle, are equal and opposite in their duration. The result will merely be that of holding the gun 44 in a vibratory condition having a neutral or medium position which corresponds to the desired aiming point of the gun 44.

So long as the tank hull is in such a position that gun 44 has the desired elevation, the gyroscope 362 (Fig. 15b) will control the switching mechanism for the solenoids so that energization of the solenoids that control valve 320 will be had in equal duration pulses, alternately, as was clearly described above. Therefore the vibratory motion without any displacement, as just described, will be produced in gun 44.

However, should the hull of the tank change position due to rough terrain such as hills, or the like, the gyroscope 362 (Fig. 15b) will sense this change of position and will correspondingly vary the duration of the energization of the coils which actuate the valve 320, by increasing the length of time that one coil is energized and decreasing the length of time the other coil is energized in any given cycle. Therefore, a differential in the duration of the hydraulic pulses which are produced in the elevation cylinder 340 will be set up and this differential will cause a displacement of the piston 341 within the cylinder 340 in the required manner to change the elevation of the gun 44 relative to the hull of the tank upon which it is mounted, so that the gun elevation will not change relative to the earth. This is the usual operation of a stabilization system as controlled by a gyroscope; however, it will be noted that our system enables the inertia of the gun 44 to work with the stabilization effect rather than against the same. This is due to the floating action which was described above.

When it is desired to superimpose a manual repositioning of the gun 44 while leaving the stabilization system in operation, the gunner may manipulate his manual controls 314 and by means of the electric circuits described above. He will thus cause a repositioning of the gyroscope itself in such a way as to introduce an artificial error signal, so that the hydraulic system will act to reposition gun 44 in a manner as just described with regard to stabilization.

There is also a manual hydraulic system for controlling the position of the gun 44 in case the stabilization or automatic control system is not in operation due to a failure of hydraulic pressure. This manual system is simply comprised of a mechanical hydraulic pump 323 which may be manually operated in one direction or the other to circulate hydraulic fluid in such a way as to reposition the piston 341 within its cylinder 340. This may be accomplished when the automatic system is not operating because the change-over valve 322 will be positioned (by its spring) to the left, as viewed in Fig. 15b, and therefore the hydraulic lines 359 and 358 from the manual pump 323 will be connected to the lines 347 which lead to the elevation cylinder 340.

While we have illustrated specific embodiments of the system contemplated by this invention, they are not to be taken as limiting in any sense the scope of the invention herein. Reference is made to the appended claim for the scope of this invention.

Having thus described our invention, we claim:

In a hydraulic system having electric controls therefor wherein said electric controls require a time delay for a starting period before reliable operation may be had, a safety device comprising bypass valve means for disabling said hydraulic system, electrical latching means comprising a cam being integrally attached to said bypass valve and having a radial sided high, a pin spring biased into contact with said cam, and a solenoid for withdrawing said pin from said cam when said electric controls have completed the starting period, and electric switch means operated by said cam when said bypass valve is closed for maintaining said electric controls energized so long as said hydraulic system is not disabled.

References Cited in the file of this patent

UNITED STATES PATENTS

| | | |
|---|---|---|
| 1,616,841 | Beebe | Feb. 8, 1927 |
| 1,799,112 | Miedbrodt | Mar. 31, 1931 |
| 2,311,864 | Parsons | Feb. 23, 1943 |
| 2,381,161 | Lynn | Aug. 7, 1945 |
| 2,388,010 | Pohl | Oct. 30, 1945 |
| 2,404,127 | Ernst | July 16, 1946 |
| 2,409,190 | Brown et al. | Oct. 15, 1946 |
| 2,409,517 | Schmidt | Oct. 15, 1946 |
| 2,423,856 | Stone | July 15, 1947 |
| 2,423,935 | Hart | July 15, 1947 |
| 2,436,379 | Chinn | Feb. 24, 1948 |
| 2,528,645 | Edwards | Nov. 7, 1950 |
| 2,532,334 | Rhyne et al. | Dec. 5, 1950 |
| 2,559,577 | Tear | July 3, 1951 |
| 2,569,571 | Newell et al. | Oct. 2, 1951 |
| 2,591,800 | Gardiner | Apr. 8, 1952 |
| 2,614,390 | Poitras et al. | Oct. 21, 1952 |
| 2,655,939 | Tauscher et al. | Oct. 20, 1953 |
| 2,681,116 | Treseder | June 15, 1954 |